United States Patent
Thota et al.

(12)

(10) Patent No.: US 12,450,679 B2
(45) Date of Patent: Oct. 21, 2025

(54) METHODS AND APPARATUS FOR DECENTRALIZED CONTENT MEASUREMENT

(71) Applicant: The Nielsen Company (US), LLC, New York, NY (US)

(72) Inventors: Sudheer Thota, Oldsmar, FL (US); John Charles Peiffer, New Port Richey, FL (US)

(73) Assignee: The Nielsen Company (US), LLC, New York, NY (US)

( * ) Notice: Subject to any disclaimer, the term of this patent is extended or adjusted under 35 U.S.C. 154(b) by 362 days.

(21) Appl. No.: 17/967,596

(22) Filed: Oct. 17, 2022

(65) Prior Publication Data

US 2023/0214954 A1   Jul. 6, 2023

Related U.S. Application Data

(60) Provisional application No. 63/266,301, filed on Dec. 31, 2021.

(51) Int. Cl.
*G06K 9/00* (2022.01)
*G06T 1/00* (2006.01)

(52) U.S. Cl.
CPC .................. *G06T 1/0092* (2013.01)

(58) Field of Classification Search
CPC ... G06T 1/0092; G06T 1/0071; G06T 1/0078; G06T 1/0085; H04L 2012/5682
See application file for complete search history.

(56) References Cited

U.S. PATENT DOCUMENTS

| | | |
|---|---|---|
| 5,450,490 A | 9/1995 | Jensen et al. |
| 5,481,294 A | 1/1996 | Thomas et al. |
| 5,574,962 A | 11/1996 | Fardeau et al. |
| 5,581,800 A | 12/1996 | Fardeau et al. |
| 5,764,763 A | 6/1998 | Jensen et al. |
| 5,787,334 A | 7/1998 | Fardeau et al. |
| 6,871,180 B1 | 3/2005 | Neuhauser et al. |
| 8,359,205 B2 | 1/2013 | Srinivasan et al. |
| 8,369,972 B2 | 2/2013 | Topchy et al. |
| 10,628,906 B2 * | 4/2020 | Zachary ................ H04N 7/188 |
| 11,481,786 B2 * | 10/2022 | Diehl ..................... H04L 9/3239 |
| 11,922,532 B2 * | 3/2024 | Alattar ................... G06V 40/16 |
| 12,081,813 B2 * | 9/2024 | Fujimura ........... H04N 21/8358 |
| 12,141,249 B2 * | 11/2024 | Chui ........................ G06F 16/25 |
| 2010/0223062 A1 | 9/2010 | Srinivasan et al. |
| 2020/0012765 A1 * | 1/2020 | Smaiely ................ H04L 9/3297 |
| 2021/0336796 A1 * | 10/2021 | Wiklof ................... H04L 9/3228 |
| 2021/0366074 A1 * | 11/2021 | Beattie, Jr. ........... H04N 19/467 |
| 2022/0067870 A1 * | 3/2022 | Kronstadt ........ G06K 19/06037 |
| 2023/0214954 A1 * | 7/2023 | Thota .................... G06T 1/0092 382/100 |

\* cited by examiner

*Primary Examiner* — Shervin K Nakhjavan

(57) ABSTRACT

Methods, apparatus, systems and articles of manufacture are disclosed for encoding a watermark using a multichain blockchain. An example apparatus disclosed herein includes permission manager circuitry to detect a request from a requesting device, the request for watermark payload elements to encode in a media asset and blockchain client interface circuitry to allocate, via a first transaction on a blockchain maintained by a blockchain network, the water payload elements.

20 Claims, 13 Drawing Sheets

METHODS AND APPARATUS FOR DECENTRALIZED CONTENT MEASUREMENT

RELATED APPLICATION

This patent claims the benefit of U.S. Provisional Patent Application No. 63/266,301, which was filed on Dec. 31, 2021. U.S. Provisional Patent Application No. 63/266,301 is hereby incorporated herein by reference in its entirety. Priority to U.S. Provisional Patent Application No. 63/266,301 is hereby claimed.

FIELD OF THE DISCLOSURE

This disclosure relates generally to media management, and, more particularly, to methods and apparatus for decentralized content measurement.

BACKGROUND

Media providers and/or other entities (e.g., advertising companies, broadcast networks, etc.) are often interested in the viewing, listening, and/or media behavior of audience members and/or the public in general. The media usage and/or exposure habits of monitored audience members, as well as demographic data about the audience members, are collected and used to statistically determine the size and demographics of an audience of interest. Media providers and/or other entities often embed codes and/or watermarks into media for identification purposes. Watermarking is a technique used to identify media such as television broadcasts, radio broadcasts, advertisements (television and/or radio), downloaded media, streaming media, prepackaged media, etc. Existing watermarking techniques identify media by embedding audio codes (e.g., watermarks), such as media identifying information and/or an identifier that may be mapped to media identifying information, into an audio and/or video component.

BRIEF DESCRIPTION OF THE DRAWINGS

In general, the same reference numbers will be used throughout the drawing(s) and accompanying written description to refer to the same or like parts. The figures are not to scale.

DETAILED DESCRIPTION

Figure 1:
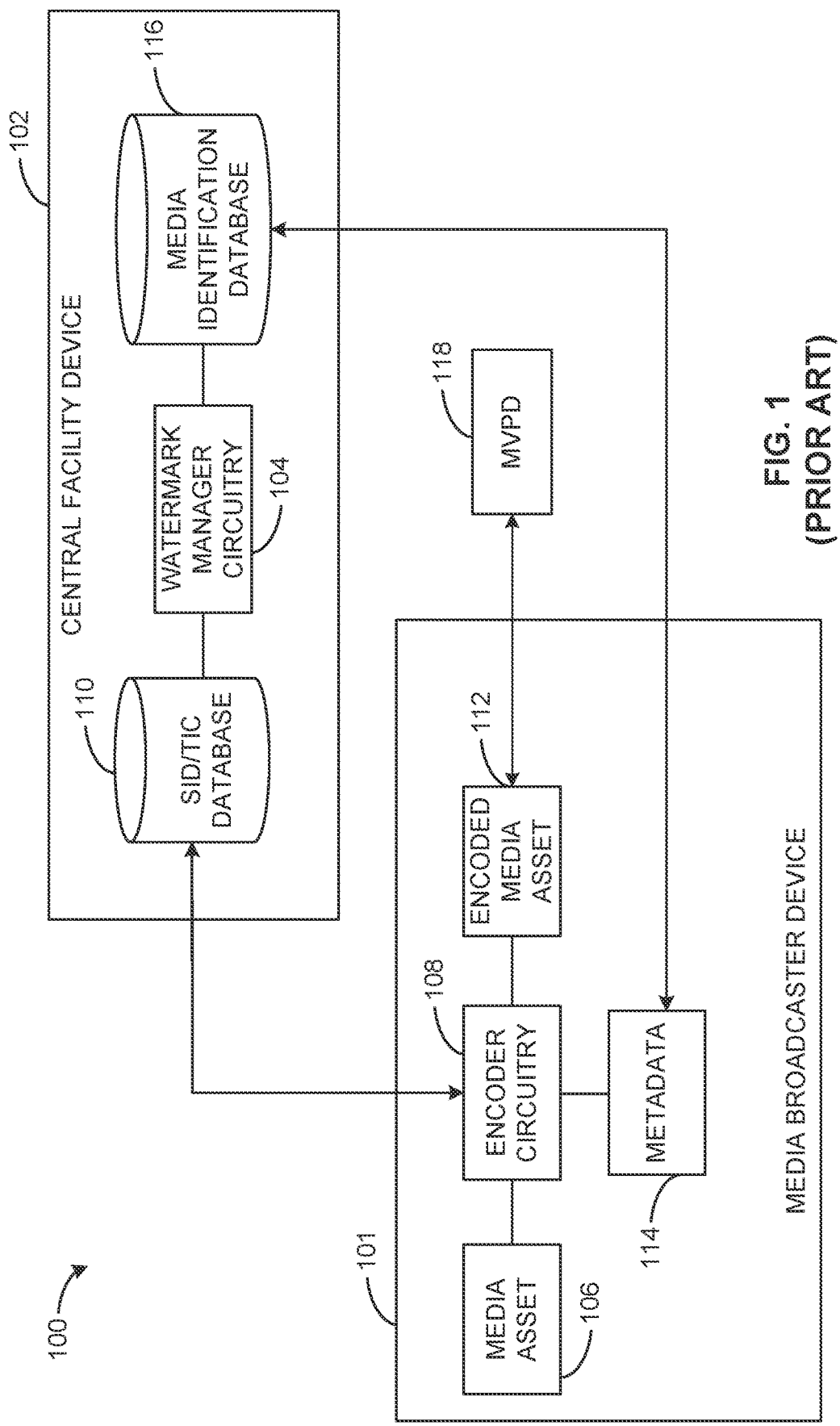
FIG. 1 is a block diagram of a prior-art watermark encoding system.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time +/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

Blockchain technology is a distributed computing mechanism designed to provide a degree of fairness such that one entity is not advantaged while another entity is disadvantaged. A blockchain is a distributed ledger of transactions (e.g., financial transactions, data transactions, etc.) in which the transactions are recorded and chronologically and can be verified by participants without a central authority. Blockchain applies cryptographic algorithms to a shared or distributed database to allow a user to read the database, add to the database, and help ensure no single user can control what is written to the distributed database. Any blockchain user can view all transactions with respect to the distributed database. Blockchain technology provides disintermediation to reduce intermediaries in communication between data producers and data consumers. That is, rather than engaging a middleman to facilitate a transaction, two entities (e.g., a data consumer and a data supplier, etc.) can connect and engage in a transaction directly. Other entities can see the transaction, so the blockchain serves as a distributed consensus engine for the entities to verify and/or otherwise agree to the existence of the transaction.

When an entity seeks to add information to the blockchain, participating entities, which have copies of the existing blockchain, run algorithms to evaluate and verify the proposed addition (e.g., the proposed transaction, etc.). As used herein, each of these entities is referred to as a "node" of the blockchain. Each node of a blockchain includes a full copy of the ledger. If a majority of participating entities agree that the addition is valid (e.g., matches the blockchain's history, etc.), then the addition becomes a new block in the blockchain, viewable by the participating entities. A copy of the updated blockchain is conveyed to each participating entity so each entity can see the transaction and has an up-to-date copy of the blockchain log of transactions.

Examples disclosed herein use private blockchains to distribute watermark information from media monitor entities to watermark encoders, like media broadcasters. Private blockchains limit the visibility of the blockchain's ledger to chosen participants and control which transactions are permitted. In some examples, private blockchains include a list of permitted nodes. This list enables a handshaking process to occur between connecting nodes, which involves each node verifying the other node is on the list of permitted nodes. Some private blockchains also enable one node (e.g., a primary node, an administrator node, etc.) to grant and revoke privileges for other nodes. Additionally, in some examples, blockchains can include multiple blockchains with corresponding ledgers. In such examples, particular nodes in the blockchain can be associated with a particular blockchain. Nodes in the blockchain not associated with a particular blockchain are not able to access/view the ledger associated with that blockchain.

Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the audio or video component is selected to have a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. As used herein, a "media asset" refers to a discrete portion of media and can correspond to specific programming (e.g., a television program, a movie, a sporting event, etc.). To identify watermarked media, the watermark(s) are extracted and used to access a table of reference watermarks that are mapped to media identifying information.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s)(e.g., the audio and/or video signals forming the media presentation being monitored). A signature may be a series of signatures collected in series over a timer interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

Some media providers and/or other entities provide video on demand (VOD). In some examples, media providers and/or other entities provide recently telecast video on demand (RTVOD). Media providers and/or other entities utilize hardware and/or software encoders to encode watermarks and/or codes into RTVOD and/or other types of recently broadcast media. Additionally or alternatively, in some examples, watermarks and/or codes can be encoded into video and/or other types of media that are selected to be provided as RTVOD and/or recently broadcast media on demand ahead of the broadcast time. This pre-broadcast (e.g., ahead of time) technique, can be accomplished by encoding watermarks and/or codes into a copy of the video and/or other media that is selected to be provided as RTVOD and/or recently broadcast media on demand. These encoding watermarks are provided by media monitoring companies to broadcasters and/or media providers. However, due to the number of watermarks provided by media monitoring companies to broadcasters can be large, broadcasters can mistakenly embed the wrong watermark into media and/or fail to embed a watermark into the media.

Examples disclosed herein include references to source identifiers (hereafter "SIDs") and time in content codes (hereafter "TICs"). As used herein, the term "SID" refers to the portion of the watermark that identifies the source of the media. SIDs can include data that can be used to identify the particular media event (e.g., the particular movie, the particular television episode, etc.), the station (e.g., TBS, CNN, etc.), and/or any other information that can be used to identify the media. As used herein, the term "TIC" refers to the portion of the watermark that identifies the current temporal location in the media (e.g., timestamp, etc.). In some examples disclosed herein, TICs can correspond to an original broadcast of the media, an absolute time (e.g., a real date and time in the future, etc.), and/or a relative time (e.g., measured from the beginning of the media, etc.).

Offline media exposure measurement may involve processes that are manually intensive. Such a manual process may involve maintaining a centralized file transfer system for aggregating metadata generated during watermark encoding. This manpower-intensive process increases the chances of human errors including data duplication, corrupt files, and the improper encoding of watermark information. Additionally, current offline media exposure measurement involves systems with tight node-locking and a closed network.

Examples disclosed herein overcome the above-noted deficiencies using blockchain technology and enable a metadata aggregation process in near real-time with secure transactions. In examples disclosed herein, a media monitoring entity and a media broadcaster entity act as nodes on a private blockchain. In some examples disclosed herein, each private blockchain generated by the media monitoring entity corresponds to a specific SID and includes a quantity of TICs, which act as the medium of exchange on the private blockchain. In the examples disclosed herein, each action that involves TICs (e.g., the encoding of the TICs into a media asset, the transfer of TICs between the media monitoring entity and a media broadcaster entity, etc.) is recorded in the ledger of the private blockchain. In some examples disclosed herein, client on-boarding, SID allocation, and encoding are immutable transactions over permission-based decentralized blockchain technology. As used herein the term "media asset" refers to a discrete piece of media (e.g., an episode of a television program, a movie, a commercial, a song, a sporting event, etc.).

Examples disclosed herein can be implemented as a multichain blockchain system. For example, each blockchain of the multichain system can correspond to a particular SID (e.g., as generated by the central facility, etc.) and the medium of transactions (e.g., the currency of the blockchain, etc.) on each blockchain are the TICs associated with the specific SID of the blockchain. In some examples disclosed herein, the media assets can be encoded with first watermark portions based on the received TICS and second watermark portions based on the identity of the blockchain (e.g., the SID associated with the blockchain, etc.). As such, as particular TICs are used to encode a media asset, an immutable record associated with the corresponding SID blockchain is created and stored on the ledger associated with the blockchain. Each SID blockchain allows both the central facility and the client device to have an immutable record of the encoding, thereby preventing the erroneous duplication of encoded watermark information.

FIG. 1 is an illustration of an example prior watermark encoding system 100. In FIG. 1, the system 100 includes an example media broadcaster device 101 and an example central facility device 102. The devices 101, 102 can be implemented as any suitable computing device (e.g., a personal computer, a server, etc.). While the devices 101, 102 are depicted in FIG. 1 and described herein as individual devices, the devices 101, 102 can be implemented by a plurality of devices (e.g., personal computers, laptops, servers, etc.) and/or via cloud service.

In FIG. 1, the central facility device 102 includes example watermark manager circuitry 104 which enables the central facility device 102 to allocate watermark information (e.g., SIDS, TICs, etc.) and/or encoding software (e.g., the encoder circuitry 108, associated installation software, etc.) to the media broadcaster device. The allocation of watermark information to the media broadcaster device 101 enables the media broadcaster device 101 to embed watermarks from the central facility device 102 into media assets (e.g., the media asset 106, etc.). After the watermark information has been embedded into a media asset 106, the media asset 106 can be identified by the central facility device 102 when the media asset 106 is viewed by a user of the multichannel video programming distributor service (MVPDS) (e.g., a video on-demand service, etc.). The watermark manager circuitry 104 can also include a permission manager tool for use on the media broadcaster device 101 that prevents the encoder circuitry 108 from operating without authorization from the central facility device 102. The media asset 106 is a discrete segment of media that is to be uploaded to a video on-demand service by the media broadcaster device 101. For example, the media asset 106 can include a movie, an episode of a television program, a segment of previously recorded live broadcast, etc. In FIG. 1, the media asset 106 may or may not include any encoded watermarks (e.g., other watermarks encoded by the media broadcaster device, other watermarks encoded by other entities, etc.) and/or identifiers prior to being processed by the encoder circuitry 108.

Because the media asset 106 is being uploaded to an on-demand service, the TICs allocated by the watermark manager circuitry 104 do not need to correspond to an initial broadcast time of the media asset 106 and can refer to any arbitrary time determined by the watermark manager circuitry 104 (e.g., an absolute time in the future, an absolute time in the past, etc.). In some examples, each SID generated by the watermark manager circuitry 104 can have an associated range of TICs (e.g., 1 to 936,000,000, etc.). In some examples, because the main requirement of the SID/TIC combination is to uniquely identify the media asset 106, the TIC range of the watermarks encoded in the media asset 106 does not need to correspond to a real time and instead, can correspond to any range suitable to uniquely identify the media asset 106 (e.g., the media asset 106 is encoded with SID/TIC combinations that have not been encoded into other media assets, etc.).

The encoder circuitry 108 is provided by the central facility device 102 to the media broadcaster device 101. In some examples, an encoder and/or related software/hardware are provided by a central facility device 102. In FIG. 1, the encoder circuitry 108 encodes watermark information into the media asset 106 by interfacing with the SID/TIC database 110. Based on the duration of the media asset 106 and the previously allocated watermark information by the watermark manager circuitry 104, the SID/TIC database 110 transmits the watermark information (e.g., one or more SIDs, one or more TICs, etc.) to the encoder circuitry 108. In some examples, to uniquely identify the particular media asset 106, the SID/TIC database 110 can allocate a single SID (e.g., corresponding to the media broadcaster, etc.), a start TIC (e.g., the first TIC to be encoded into the media asset 106, etc.), and an end TIC (e.g., the last TIC to be encoded into the media asset 106, etc.). While the SID/TIC database 110 is depicted as part of the central facility device 102, in other examples, the SID/TIC database 110 can be implemented at any other suitable location (e.g., a third-party location, the cloud, the media broadcaster device 101, etc.).

After receiving the watermark information, the encoder circuitry 108 encodes the media asset 106 with the watermark information to generate the encoded media asset 112. The encoded media asset 112 is a version of the media asset 106 with encoded watermark information from the SID/TIC database 110. In some examples, the encoded media asset 112 periodically (e.g., every 8 frames, etc.) includes a watermark generated from the provided watermark information. In some such examples, each of these encoded watermarks includes the same SID and a different TIC (e.g., beginning with the start TIC proceeding sequentially to the end TIC, etc.). The media broadcaster device 101 can provide (e.g., distribute, upload, etc.) the encoded media asset 112 to a MVPD 118. The MVPD 118 can then allow a media consumer to consume (e.g., view, listen to, etc.) the encoded media asset 112 at a time convenient to the media consumer (e.g., on-demand, etc.).

Further examples of watermark encoding techniques that may be implemented by the example encoder circuitry 108, and corresponding example watermark detection techniques are described in U.S. Pat. No. 8,359,205, entitled "Methods and Apparatus to Perform Audio Watermarking and Watermark Detection and Extraction," which issued on Jan. 22, 2013, U.S. Pat. No. 8,369,972, entitled "Methods and Apparatus to Perform Audio Watermarking Detection and Extraction," which issued on Feb. 5, 2013, U.S. Publication No. 2010/0223062, entitled "Methods and Apparatus to Perform Audio Watermarking and Watermark Detection and Extraction," which was published on Sep. 2, 2010, U.S. Pat. No. 6,871,180, entitled "Decoding of Information in Audio Signals," which issued on Mar. 22, 2005, U.S. Pat. No. 5,764,763, entitled "Apparatus and Methods for Including Codes in Audio Signals and Decoding," which issued on Jun. 9, 1998, U.S. Pat. No. 5,574,962, entitled "Method and Apparatus for Automatically Identifying a Program Including a Sound Signal," which issued on Nov. 12, 1996, U.S. Pat. No. 5,581,800, entitled "Method and Apparatus for Automatically Identifying a Program Including a Sound Signal," which issued on Dec. 3, 1996, U.S. Pat. No. 5,787,334, entitled "Method and Apparatus for Automatically Identifying a Program Including a Sound Signal," which issued on Jul. 28, 1998, and U.S. Pat. No. 5,450,490, entitled "Apparatus and Methods for Including Codes in Audio Signals and Decoding," which issued on Sep. 12, 1995, all of which are hereby incorporated by reference in their entireties.

In FIG. 1, the encoder circuitry 108 also generates metadata 114. The metadata 114 is a record of the encoding of the media asset 106 by the encoder circuitry 108. The metadata 114 can include the encoded watermark information and an identifier of the media asset 106 (e.g., the name of the media asset, etc.). In FIG. 1, the metadata 114 is transmitted to the media identification database 116 of the central facility device 102. In some examples, the metadata 114 can also include a distribution source identifier (DSID), which can identify the MVPD 118 and/or the media broadcaster associated with the media broadcaster device 101. The metadata 114 can be formatted as an Extensible Markup Language (xml) file and/or in any other suitable format. The media identification database 116 logs the media identifier and associated watermark information of the metadata 114. When the watermark information is detected by a media monitor associated with a media consumer, the information identification database 116 can associate the detected watermark information with the media identifier, thereby allowing the central facility to determine the media consumer consumed the media asset 106 via the MVPD 118.

The prior art system 100 includes a comparatively large number of related processes (e.g., the watermark manager circuitry 104, the encoder circuitry 108, the transfer of the metadata 114 to the central facility device 102, a permission manager associated with the client device, etc., etc.). The prior art system 100 requires a number of manual inputs to the system and back and forth communication between the central facility device 102 and the media broadcaster device 101. The system 100 is tightly coupled and is a closed system 100, which can be subjected to unwanted disruption. Additionally, in some operating conditions, the manual processing associated with the system 100 can cause watermark information to be duplicated during the encoding and metadata process, which can decreasing bandwidth, memory, and processor efficiency.

The following examples refer to a media broadcaster device and a central facility device, similar to the devices described with reference to FIG. 1, except the central facility devices and the media broadcaster device have been modified to accommodate watermark permission allocation and encoding via a multichain blockchain system in accordance with teachings of this disclosure. When the same element number is used in connection with FIGS. 2-13 as was used in FIG. 1, it has the same meaning unless indicated otherwise.

Figure 2:
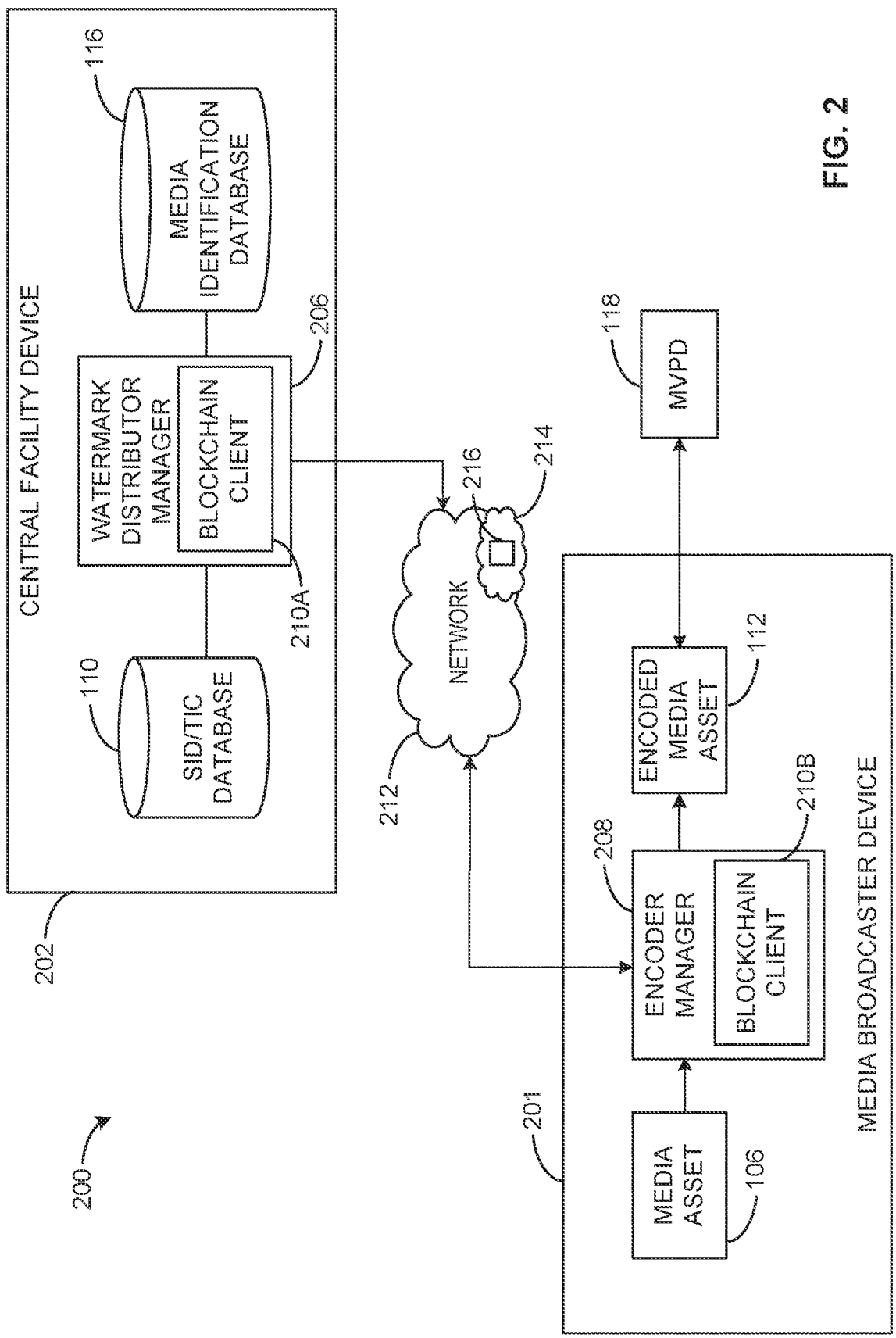
FIG. 2 is a block diagram of a watermark encoding system in which the teachings of this disclosure can be implemented.

FIG. 2 is a block diagram of an example watermark encoding system 200 implemented in accordance with the teachings of this disclosure. In FIG. 2, the example system 200 includes an example media broadcaster device 201 and an example central facility device 202 of FIG. 2. The devices 201, 202 can be implemented as any suitable computing device (e.g., a personal computer, a server, etc.). While the devices 201, 202 are depicted in FIG. 2 and described herein as individual devices, the devices 201, 202 can be implemented by a plurality of devices (e.g., personal computers, laptops, servers, etc.) and/or via cloud service.

In the illustrated example of FIG. 2, the central facility device 202 includes an example watermark distributor manager 206, an example first blockchain client 210A, the SID/TIC database 110 of FIG. 1, and the media identification database 116 of FIG. 1. In the illustrated example of FIG. 2, the media broadcaster device 201 includes an example encoder manager 208 and an example second blockchain client 210B, which like the media broadcaster device 101 of FIG. 1, encodes the media asset 106 with watermarks thereby generating the encoded media asset 112 for use with the MVPD 118. In the illustrated example of FIG. 2, the central facility device 202 and the media broadcaster device 201 communicate via an example network 212. In the illustrated example of FIG. 2, the network 212 implements an example blockchain network 214 including an example blockchain 216.

The watermark distributor manager 206 allocates watermark information (e.g., SIDS, TICs, etc.) and/or encoding software (e.g., the encoder manager 208, the second blockchain client 210B, etc.) to the media broadcaster device 201. For example, the watermark distributor manager 206 can generate the blockchain 216 associated with a specific SID of the SID/TIC database 110 and grant access to the media broadcaster device 201 to conduct transactions on the generated blockchain 216. In some such examples, each unit of the transaction medium of the blockchain 216 is a TIC of the SID/TIC database 110. In some examples, the watermark distributor manager 206 can respond to and process permission requests to encode media assets (e.g., the media asset, etc.). In some examples, the permission request can be transmitted over the blockchain 216 (e.g., a request to allocate more TICs for use with the SID associated with the blockchain 216, etc.). Additionally or alternatively, the request can be transmitted over the network 214 and/or any other suitable means. In some examples, as TICs are requested by the media broadcaster device 201, the watermark distributor manager 206 can, via the first blockchain client 210A, conduct a transaction that transfers the associated TICS to the media broadcaster device 201. The first blockchain client 210A publishes this transaction to a ledger associated with the blockchain 216, thereby creating an immutable record of the transaction (e.g., the allocated TICS and the associated SID of the blockchain 216, etc.).

Like the encoder circuitry 108 of FIG. 1, the encoder manager 208 encodes the media asset 106 with the watermark information to generate the encoded media asset 112 of FIG. 1. In some examples, in response to receiving a media asset to encode with watermark (e.g., the media asset 106, etc.), the encoder circuitry 108 can request permission from the central facility device 202 (e.g., via the network 212, via a blockchain transaction, etc.) to encode the media asset 106. In some examples, the encoding of the media asset 106 with the received TICs is conducted as a transaction on the blockchain 216, thereby creating an immutable record on the blockchain 216. Such a record enables the watermark distributor manager 206 to verify that the media asset 106 was encoded with the correct watermark portions and update the media identification database 116 accordingly. In some examples, after encoding the media asset 106, the encoder manager 208 can revert the allocated TICs, via a transaction on the blockchain 216 conducted by the second blockchain client 210B, to the central facility device 202 to prevent the erroneous encoding of other media assets with TICs allocated for the media asset 106. In some examples, after the encoded media asset 112 has been generated by the encoder manager 208, the encoder manager 208 can publish the encoded media asset 112 to MVPD 118. An example communication diagram illustrating the permission and encoding process is described below in conjunction with FIG. 6.

The blockchain clients 210A, 210B conducts transactions and publishes data transaction records to the blockchain 216 and/or other blockchains of the blockchain network 214 associated with the devices 201, 202. For example, the first blockchain client 210A can create the blockchain 216 on the blockchain network 214 with the devices 201, 202 acting as the only nodes on the generated blockchain 216. In some examples, the blockchain clients 210A, 210B can enable the watermark distributor manager 206 and encoder manager 208, respectively, to transfer TICs therebetween. In some examples, the blockchain clients 210A, 210B enable the watermark distributor manager 206 and encoder manager 208 to review and publish to the ledger of the blockchain 216 associated with the devices 201, 202. An example implementation and operation of the blockchain clients 210A, 210B is described below and in connection with FIG. 5.

The network 212 enables communications between the central facility device 202 and the media broadcaster device 201. In some examples, the network 212 can be implemented as a cellular network, a satellite network, the internet, or any other suitable wide area network (WAN). In other examples, the network 212 can be implemented by a local area network (LAN) and/or a proprietary network. In other examples, the network 212 can be a wired connection. In some examples, the network 212 can be implemented via multiple networks (e.g., a local area network coupled to a wide area network, etc.). In some examples, prior to communications via the blockchain network 214, the central facility device 202 and the media broadcaster device 201 can communicate via conventional communications on the network 214 (e.g., via email, via a web-based platform, etc.) to enable (e.g., register, etc.) the media broadcaster device 201 to communicate on the blockchain network 214.

In the illustrated example of FIG. 2, the blockchain network 214 is implemented via the example network 212. In some examples, some or all of the blockchain network 214 can be hosted on the media broadcaster device 201, the central facility device 202, another device associated with the media broadcaster, another device associated with the central facility, a third-party service (e.g., a cloud service, etc.), and/or a combination thereof. In the illustrated example of FIG. 2, the central facility device 202 and the media broadcaster device 201 act as nodes in the blockchain network 214 (e.g. implemented on the network 212, etc.). In some examples, the blockchains of the blockchain network 214 associated with each SID are private and require permission for each node involved in a transaction to read and/or write to the blockchain(s). In some examples, the central facility device 202 acts as an administrative node, which generates SID blockchains and grants permissions to other nodes (e.g., media broadcaster devices, etc.) to read the ledger of a SID blockchain and to conduction transactions on that SID blockchain. In some examples, the central facility device 202 can provide information regarding the SID blockchain (e.g., a network location, one or more identifiers associated with the SID blockchain, a uniform resource locator (URL), etc.) and/or credentials (e.g., login one or more blockchain tokens, etc.) to the media broadcaster device 201 to enable the media broadcaster device 201 to conduction transactions on the SID blockchain. Additionally or alternatively, the central facility device 202 can provide software (e.g., a pre-programmed executable file, etc.) to the media broadcaster device 201, which when executed by the media broadcaster device 201 provides (e.g., generates, etc.) a token associated with the SID blockchain that grants permission to the media broadcaster device 201 to conduct transactions on a SID blockchain of the blockchain network 214. Unlike conventional blockchains, multichain systems are private (e.g., only nodes with permission can read and conduct transactions on a blockchain, etc.) and an infinite number of blockchains can be generated.

Figure 3:
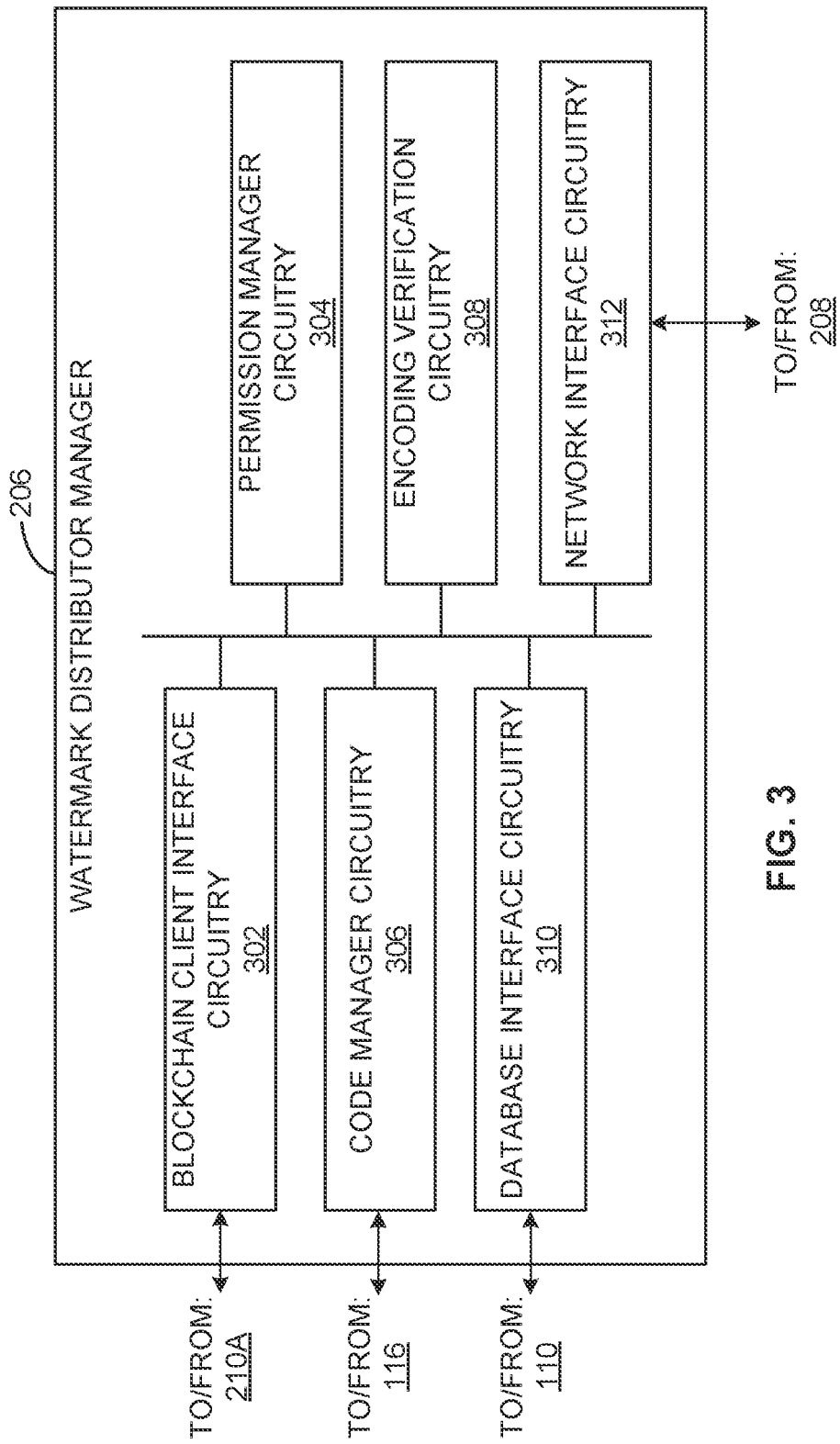
FIG. 3 is a block diagram of the example watermark distributor manager of FIG. 2.

FIG. 3 is a block diagram of the example watermark distributor manager 206 of FIG. 2 to allocate watermark code portions via a blockchain client. In the illustrated example of FIG. 3, the watermark distributor manager 206 includes example blockchain client interface circuitry 302, example permission manager circuitry 304, example code manager circuitry 306, example encoding verification circuitry 308, example media identification database interface circuitry 310, and example network interface circuitry 312. The watermark distributor manager 206 of FIG. 3 may be instantiated (e.g., creating an instance of, bring into being for any length of time, materialize, implement, etc.) by processor circuitry such as a central processing unit executing instructions. Additionally or alternatively, the watermark distributor manager 206 of FIG. 3 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 3 may, thus, be instantiated at the same or different times. Some or all of the circuitry may be instantiated, for example, in one or more threads executing concurrently on hardware and/or in series on hardware. Moreover, in some examples, some or all of the circuitry of FIG. 3 may be implemented by microprocessor circuitry executing instructions to implement one or more virtual machines and/or containers.

The blockchain client interface circuitry 302 interfaces with the first blockchain client 210A to conduct transactions and/or review entries on an associated blockchain. For example, the blockchain client interface circuitry 302 can conduct a transaction on the blockchain 216 to transfer TICs to the media broadcaster device 201. In some examples, the blockchain client interface circuitry 302 can receive reverted TICs from the media broadcaster device 201 after the encoding of the media asset 106. In some examples, the blockchain client interface circuitry 302 can review the ledger associated with the blockchain to verify the media asset 106 has been encoded and/or to review if the TICs have been allocated to a requesting media broadcasting device. In some examples, the blockchain client interface circuitry 302 detects a request to encode a media asset from a node on a blockchain administered by the central facility device 202. For example, the blockchain client interface circuitry 302 can detect a request to encode an asset on a SID blockchain from a media broadcaster. In some examples, the blockchain client interface circuitry 302 is instantiated by processor circuitry executing blockchain client interface instructions and/or configured to perform operations such as those represented by the flowchart of FIG. 7.

The permission manager circuitry 304 determines if a permission request from the media broadcaster device 201 is to be granted. For example, the permission manager circuitry 304 can base the determination of whether the permission request is to be granted based on an identity of the media broadcaster device 201 and/or the media asset 106. In some examples, the permission manager circuitry 304 can deny a permission request if an encoded media asset (e.g., the encoded media asset 112, etc.) has already been generated from the media asset 106. In some examples, the permission manager circuitry 304 can deny a request if the media broadcaster device 201 has exceeded a quota of allocated TICs over a given period (e.g., a TIC quota over a given month, etc.). If the permission manager circuitry 304 determines permission is to be granted to encode the media asset based on any other suitable means. In some examples, the permission manager circuitry 304 is instantiated by processor circuitry executing permission manager instructions and/or configured to perform operations such as those represented by the flowchart of FIG. 7.

The code manager circuitry 306 determines which watermark code portions to transfer to the requesting media broadcaster device (e.g., the media broadcaster device 201, etc.). For example, the code manager circuitry 306 can transfer TICs via the appropriate SID blockchain to the requesting node (e.g., the blockchain 216 associated with the media broadcaster device and/or the media asset 106, etc.). In some examples, the code manager circuitry 306 determines the quantity of TICs allocated to the requesting node (e.g., the requesting media broadcaster, etc.) based on the duration of the media asset (e.g., an appropriate number of TICs to encode the media watermark, etc.) and the encoding rate of the watermark associated with the TICs and the SID. In some examples, the code manager circuitry 306 allocates the TICs by conducting a transaction on the SID blockchain. In other examples, the code manager circuitry 306 can allocate the TICs in any other suitable manner. In some examples, the code manager circuitry 306 is instantiated by processor circuitry executing code manager instructions and/or configured to perform operations such as those represented by the flowchart of FIG. 7.

The encoding verification circuitry 308 verifies the encoding via the transaction records of the blockchain. For example, the central facility device 202 can verify the media asset was properly encoded (e.g., with the SID associated with the SID blockchain and allocated TICs, etc.) via the ledger of the SID blockchain. For example, the encoding verification circuitry 308 can, via the blockchain client interface circuitry 302, verify the media asset was encoded by checking to verify the encoding is marked on the ledger of the blockchain. In other examples, the encoding verification circuitry 308 can verify the media asset 106 was encoded by any other suitable means (e.g., querying the media broadcaster device 201 via the network 212, etc.). In some examples, the encoding verification circuitry 308 is instantiated by processor circuitry executing encoding verification instructions and/or configured to perform operations such as those represented by the flowchart of FIG. 7.

The media identification database interface circuitry 310 interfaces with the media identification database 116. For example, the media identification database interface circuitry 310 can associate the SID/TIC combination (e.g., the watermark portions, etc.) and the media asset 106 to ensure the media identification database 116 can be used to identify the media asset via the SID/TIC combination. In some examples, the media identification database interface circuitry 310 can edit the media identification database 116 in any other suitable manner. In some examples, the media identification database interface circuitry 310 is instantiated by processor circuitry executing media identification database interface instructions and/or configured to perform operations such as those represented by the flowchart of FIG. 7.

The network interface circuitry 312 communicates with other devices over the network 212. For example, the network interface circuitry 312 can receive permission requests from a requesting node (e.g., the media broadcaster device 201, etc.) to encode a media asset (e.g., the media asset 106, etc.) over the network 212. In some examples, the network interface circuitry 312 can inform a requesting node of a permission approval or a permission denial over the network 212. In other examples, the network interface circuitry 312 can transmit any other suitable communications over the network 212. In some examples, prior to communications via the blockchain client interface circuitry 302 and the blockchain network 214, the central facility device 202 can, via network interface circuitry 312, can send information (e.g., identifiers of a blockchain on the blockchain network, a token of a a blockchain on the blockchain network, credentials for the blockchain network, an executable file enable communications on the blockchain network, etc.) to enable (e.g., register, etc.) the media broadcaster device 201 to communicate on the blockchain network 214.

Figure 7:
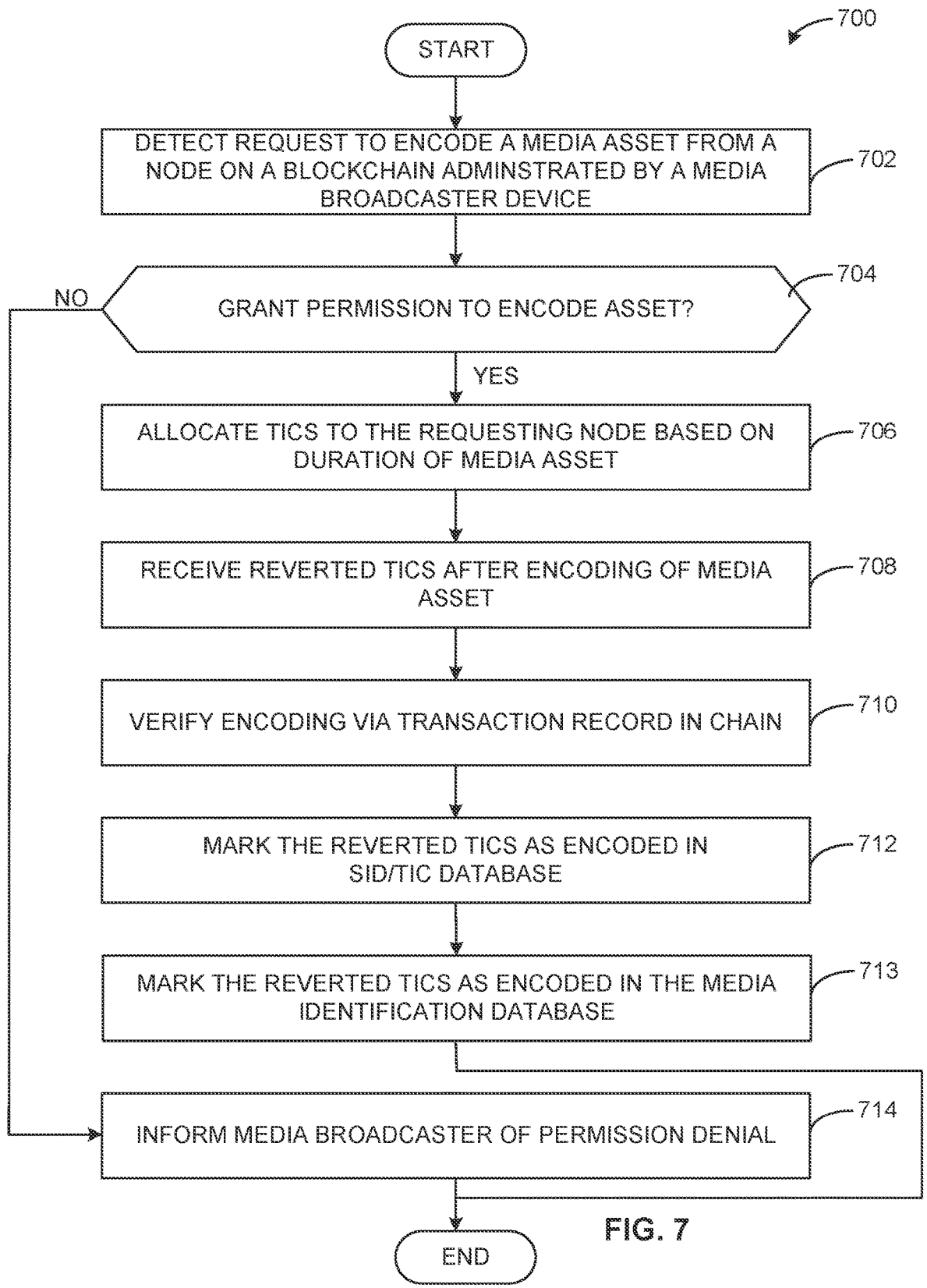
FIG. 7 is a flowchart representative of machine readable instructions which may be executed and/or instantiated to implement the example watermark distributor manager of FIGS. 2 and 3.

In some examples, the network interface circuitry 312 is instantiated by processor circuitry executing network interface instructions and/or configured to perform operations such as those represented by the flowchart of FIG. 7.

In some examples, the watermark distributor manager 206 includes means for interfacing with the blockchain client associated with the central facility device 202. For example, the means for blockchain interfacing may be implemented by blockchain client interface circuitry 302. In some examples, the blockchain client interface circuitry 302 may be instantiated by processor circuitry such as the example processor circuitry 912 of FIG. 9. For instance, the blockchain client interface circuitry 302 may be instantiated by the example microprocessor 1100 of FIG. 11 executing machine executable instructions such as those implemented by at least blocks 702, 708 of FIG. 7. In some examples, the blockchain client interface circuitry 302 may be instantiated by hardware logic circuitry, which may be implemented by an ASIC, XPU, or the FPGA circuitry 1200 of FIG. 12 structured to perform operations corresponding to the machine readable instructions. Additionally or alternatively, the blockchain client interface circuitry 302 may be instantiated by any other combination of hardware, software, and/or firmware. For example, the blockchain client interface circuitry 302 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the watermark distributor manager 206 includes means for granting permission to encode a media asset. For example, the means for permission granting may be implemented by the permission manager circuitry 304. In some examples, the permission manager circuitry 304 may be instantiated by processor circuitry such as the example processor circuitry 912 of FIG. 9. For instance, the 1012 of FIG. 10 may be instantiated by the example microprocessor 1100 of FIG. 11 executing machine executable instructions such as those implemented by at least block 704 of FIG. 7. In some examples, the permission manager circuitry 304 may be instantiated by hardware logic circuitry, which may be implemented by an ASIC, XPU, or the FPGA circuitry 1200 of FIG. 12 structured to perform operations corresponding to the machine readable instructions. Additionally or alternatively, the permission manager circuitry 304 may be instantiated by any other combination of hardware, software, and/or firmware. For example, the permission manager circuitry 304 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the watermark distributor manager 206 includes means for allocating code portions. For example, the means for allocating code portions may be implemented by code manager circuitry 306. In some examples, the code manager circuitry 306 may be instantiated by processor circuitry such as the example processor circuitry 912 of FIG. 9. For instance, the code manager circuitry 306 may be instantiated by the example microprocessor 1100 of FIG. 11 executing machine executable instructions such as those implemented by at least blocks 706 of FIG. 7. In some examples, the code manager circuitry 306 may be instantiated by hardware logic circuitry, which may be implemented by an ASIC, XPU, or the FPGA circuitry 1200 of FIG. 12 structured to perform operations corresponding to the machine readable instructions. Additionally or alternatively, the code manager circuitry 306 may be instantiated by any other combination of hardware, software, and/or firmware. For example, the code manager circuitry 306 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the watermark distributor manager 206 includes means for verifying a media asset has been encoded. For example, the means for verifying may be implemented by the encoding verification circuitry 308. In some examples, the encoding verification circuitry 308 may be instantiated by processor circuitry such as the example processor circuitry 912 of FIG. 9. For instance, the encoding verification circuitry 308 may be instantiated by the example microprocessor 1100 of FIG. 11 executing machine executable instructions such as those implemented by at least block 710 of FIG. 7. In some examples, the encoding verification circuitry 308 may be instantiated by hardware logic circuitry, which may be implemented by an ASIC, XPU, or the FPGA circuitry 1200 of FIG. 12 structured to perform operations corresponding to the machine readable instructions. Additionally or alternatively, the encoding verification circuitry 308 may be instantiated by any other combination of hardware, software, and/or firmware. For example, the encoding verification circuitry 308 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the watermark distributor manager 206 includes means for interfacing with a watermark database. For example, the means for database interfacing may be implemented by media identification database interface circuitry 310. In some examples, the media identification database interface circuitry 310 may be instantiated by processor circuitry such as the example processor circuitry 912 of FIG. 9. For instance, the media identification database interface circuitry 310 may be instantiated by the example microprocessor 1100 of FIG. 11 executing machine executable instructions such as those implemented by at least block 712 of FIG. 7. In some examples, the media identification database interface circuitry 310 may be instantiated by hardware logic circuitry, which may be implemented by an ASIC, XPU, or the FPGA circuitry 1200 of FIG. 12 structured to perform operations corresponding to the machine readable instructions. Additionally or alternatively, the media identification database interface circuitry 310 may be instantiated by any other combination of hardware, software, and/or firmware. For example, the media identification database interface circuitry 310 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the watermark distributor manager 206 includes means for interfacing with a network. For example, the means for network interfacing may be implemented by the network interface circuitry 312. In some examples, the network interface circuitry 312 may be instantiated by processor circuitry such as the example processor circuitry 912 of FIG. 9. For instance, the network interface circuitry 312 may be instantiated by the example microprocessor 1100 of FIG. 11 executing machine executable instructions such as those implemented by at least blocks 702, 708, 714 of FIG. 7. In some examples, the network interface circuitry 312 may be instantiated by hardware logic circuitry, which may be implemented by an ASIC, XPU, or the FPGA circuitry 1200 of FIG. 12 structured to perform operations corresponding to the machine readable instructions. Additionally or alternatively, the network interface circuitry 312 may be instantiated by any other combination of hardware, software, and/or firmware. For example, the network interface circuitry 312 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the watermark distributor manager 206 of FIG. 2 is illustrated in FIG. 3, one or more of the elements, processes, and/or devices illustrated in FIG. 3 may be combined, divided, re-arranged, omitted, eliminated, and/or implemented in any other way. Further, the example blockchain client interface circuitry 302, the example permission manager circuitry 304, the example code manager circuitry 306, the example encoding verification circuitry 308, the example media identification database interface circuitry 310, the network interface circuitry 312, and/or, more generally, the example watermark distributor manager 206 of FIG. 3, may be implemented by hardware alone or by hardware in combination with software and/or firmware. Thus, for example, any of the example blockchain client interface circuitry 302, the example permission manager circuitry 304, the example code manager circuitry 306, the example encoding verification circuitry 308, the example media identification database interface circuitry 310, the network interface circuitry 312, and/or, more generally, the example watermark distributor manager 206, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example watermark distributor manager 206 of FIG. 2 may include one or more elements, processes, and/or devices in addition to, or instead of, those illustrated in FIG. 3, and/or may include more than one of any or all of the illustrated elements, processes and devices.

Figure 4:
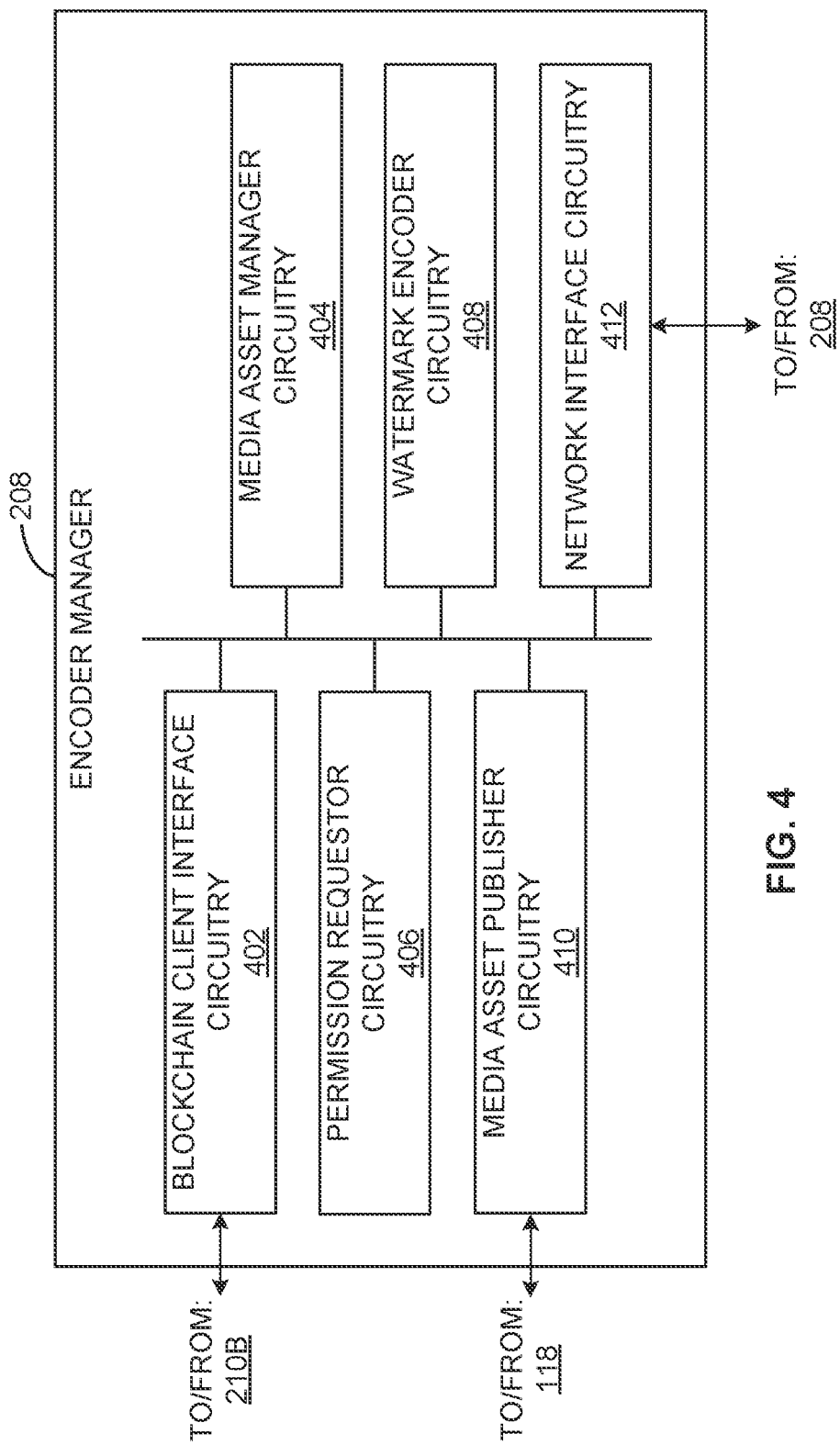
FIG. 4 is a block diagram of an example encoder manager included in the example system of FIG. 2.

FIG. 4 is a block diagram of the example encoder manager 208 of FIG. 2 to encode a media asset with code portions received from a blockchain. In the illustrated example of FIG. 4, the encoder manager 208 includes example blockchain client interface circuitry 402, example media asset manager circuitry 404, example permission requestor circuitry 406, example watermark encoder circuitry 408, and example network interface circuitry 412, The encoder manager 208 of FIG. 4 may be instantiated (e.g., creating an instance of, bring into being for any length of time, materialize, implement, etc.) by processor circuitry such as a central processing unit executing instructions. Additionally or alternatively, the encoder manager 208 of FIG. 4 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 4 may, thus, be instantiated at the same or different times. Some or all of the circuitry may be instantiated, for example, in one or more threads executing concurrently on hardware and/or in series on hardware. Moreover, in some examples, some or all of the circuitry of FIG. 4 may be implemented by microprocessor circuitry executing instructions to implement one or more virtual machines and/or containers.

The blockchain client interface circuitry 402 interfaces with the second blockchain client 210B to conduct transactions and/or review entries on an associated blockchain. For example, the blockchain client interface circuitry 402 can conduct a transaction on the blockchain to receive TICs from the central facility device 202. In some examples, the blockchain client interface circuitry 402 can revert TICs to the central facility device 202 after the encoding of the media asset 106 and the generation of the encoded media asset 112. In some examples, the blockchain client interface circuitry 402 can review the ledger associated with the blockchain to verify if given TICs have been allocated and/or if a given media asset 106 has been encoded with watermark portions. In some examples, the blockchain client interface circuitry 402 is instantiated by processor circuitry executing blockchain client interface instructions and/or configured to perform operations such as those represented by the flowchart of FIG. 8.

The media asset manager circuitry 404 receives and manages the media assets to be encoded and/or published to the MVPD 118. For example, the media asset manager circuitry 404 can access the media asset 106 from a database associated with the media broadcaster device 201. In some examples, the media asset 106 can be extracted by the media asset manager circuitry 404 from a live media stream (e.g., a live media broadcast, etc.). In some examples, the media asset manager circuitry 404 is instantiated by processor circuitry executing media asset manager instructions and/or configured to perform operations such as those represented by the flowchart of FIG. 8.

The permission requestor circuitry 406 transmits and manages requests for permission to encode media assets (e.g., the media asset 106, etc.). For example, in response to the media asset manager circuitry 404 receiving the media asset 106, the permission requestor circuitry 406 can, via the blockchain client interface circuitry 402 and/or the network interface circuitry 412, transmits a request to the central facility device 202 to encode the media asset 106. In some examples, the permission requestor circuitry 406 can send the request, via the blockchain client interface circuitry 402 via a transaction on a SID blockchain associated with the permission requestor circuitry 406, to the administrative node of the SID blockchain (e.g., the central facility device 202, etc.). In some examples, the permission requestor circuitry 406 can send the request, via the network interface circuitry 412, on the network 212. In other examples, the permission requestor circuitry 406 can transmit the request in any other suitable manner. In some examples, the permission requestor circuitry 406 is instantiated by processor circuitry executing permission requestor instructions and/or configured to perform operations such as those represented by the flowchart of FIG. 8.

The watermark encoder circuitry 408 encodes the media asset 106 with the SID associated with the SID blockchain and the received TICs. For example, the watermark encoder circuitry 408 can encode the media asset 106 with the received TICs (e.g., first watermark portions, etc.) and the SID associated with the blockchain (e.g., second watermark portions, etc.) using any appropriate watermarking technique(s). In other examples, the watermark encoder circuitry 408 can encode the media asset in any other suitable manner. In some examples, the encoding of the media asset can be recorded on the ledger associated with the SID blockchain. In some examples, the watermark encoder circuitry 408 is instantiated by processor circuitry executing watermark encoder instructions and/or configured to perform operations such as those represented by the flowchart of FIG. 8.

The media asset publisher circuitry 410 publishes the encoded media asset 112 to the MVPD 118. For example, the media asset publisher circuitry 410 can upload the encoded media asset to a server associated with the MVPD 118. In other examples, the media asset publisher circuitry 410 can publish the encoded media asset 112 by any other suitable means. In some examples, the media asset publisher circuitry 410 is instantiated by processor circuitry executing media asset publisher instructions and/or configured to perform operations such as those represented by the flowchart of FIG. 8.

The network interface circuitry 412 communicates with other devices over the network 212. For example, the network interface circuitry 312 can request permission from an administrator node (e.g., the central facility device 202, etc.) to encode a media asset (e.g., the media asset 106, etc.) over the network 212. In some examples, the network interface circuitry 412 can inform the central facility device 202 that the media asset 106 has been encoded via the network 212. In some examples, prior to communications via the blockchain client interface circuitry 302 and the blockchain network 214, the media broadcaster device can, via network interface circuitry 312, can receive information (e.g., identifiers of a blockchain on the blockchain network, a token of a a blockchain on the blockchain network, credentials for the blockchain network, an executable file enable communications on the blockchain network, etc.) from the client facility device 202 to enable (e.g., register, etc.) the media broadcaster device 201 to communicate on the blockchain network 214.

Figure 8:
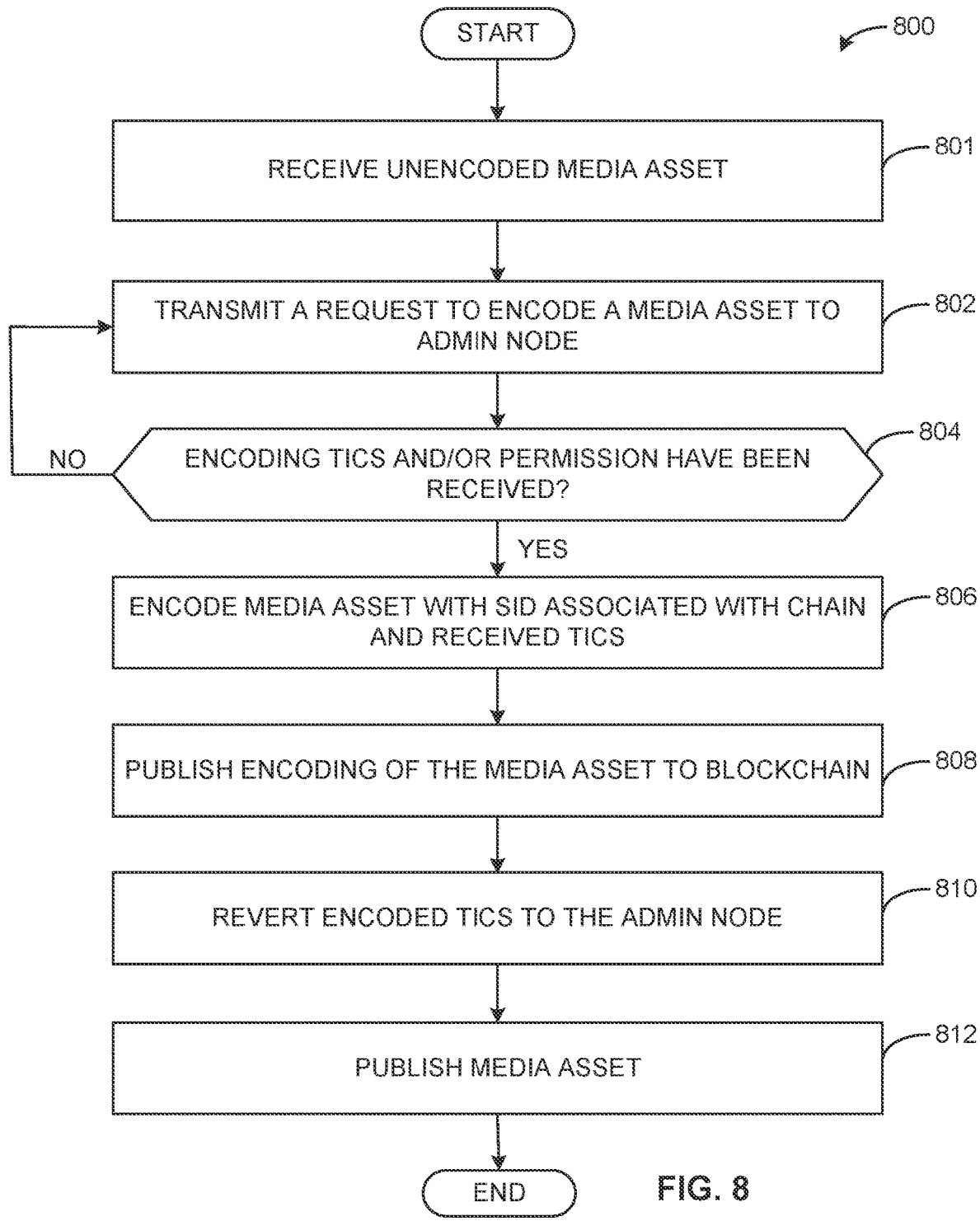
FIG. 8 is a flowchart representative of machine readable instructions which may be executed and/or instantiated to implement the function of the example encoder manager of FIGS. 2 and 4.

In some examples, the network interface circuitry 412 is instantiated by processor circuitry executing network interface instructions and/or configured to perform operations such as those represented by the flowchart of FIG. 8.

In some examples, the encoder manager 208 includes means for interfacing with the blockchain client associated with the media broadcaster device 201. For example, the means for blockchain interfacing may be implemented by blockchain client interface circuitry 402. In some examples, the blockchain client interface circuitry 402 may be instantiated by processor circuitry such as the example processor circuitry 1012 of FIG. 10. For instance, the blockchain client interface circuitry 402 may be instantiated by the example microprocessor 1100 of FIG. 11 executing machine executable instructions such as those implemented by at least blocks 808, 812 of FIG. 8. In some examples, the blockchain client interface circuitry 402 may be instantiated by hardware logic circuitry, which may be implemented by an ASIC, XPU, or the FPGA circuitry 1200 of FIG. 12 structured to perform operations corresponding to the machine readable instructions. Additionally or alternatively, the blockchain client interface circuitry 402 may be instantiated by any other combination of hardware, software, and/or firmware. For example, the blockchain client interface circuitry 402 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the encoder manager 208 includes means for managing a media asset. For example, the means for managing may be implemented by media asset manager circuitry 404. In some examples, the media asset manager circuitry 404 may be instantiated by processor circuitry such as the example processor circuitry 1012 of FIG. 10. For instance, the media asset manager circuitry 404 may be instantiated by the example microprocessor 1100 of FIG. 11 executing machine executable instructions such as those implemented by at least blocks 702, 704 of FIG. 7. In some examples, the media asset manager circuitry 404 may be instantiated by hardware logic circuitry, which may be implemented by an ASIC, XPU, or the FPGA circuitry 1200 of FIG. 12 structured to perform operations corresponding to the machine readable instructions. Additionally or alternatively, the media asset manager circuitry 404 may be instantiated by any other combination of hardware, software, and/or firmware. For example, the media asset manager circuitry 404 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the encoder manager 208 includes means for requesting permission to encode a media asset. For example, the means for requesting permission may be implemented by the permission requestor circuitry 406. In some examples, the permission requestor circuitry 406 may be instantiated by processor circuitry such as the example processor circuitry 1012 of FIG. 10. For instance, the permission requestor circuitry 406 may be instantiated by the example microprocessor 1100 of FIG. 11 executing machine executable instructions such as those implemented by at least blocks 802 of FIG. 8. In some examples, the permission requestor circuitry 406 may be instantiated by hardware logic circuitry, which may be implemented by an ASIC, XPU, or the FPGA circuitry 1200 of FIG. 12 structured to perform operations corresponding to the machine readable instructions. Additionally or alternatively, the permission requestor circuitry 406 may be instantiated by any other combination of hardware, software, and/or firmware. For example, the permission requestor circuitry 406 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the encoder manager 208 includes means for encoding a media asset. For example, the means for encoding may be implemented by the watermark encoder circuitry 408. In some examples, the watermark encoder circuitry 408 may be instantiated by processor circuitry such as the example processor circuitry 1012 of FIG. 10. For instance, the watermark encoder circuitry 408 may be instantiated by the example microprocessor 1100 of FIG. 11 executing machine executable instructions such as those implemented by at least blocks 804, 806 of FIG. 8. In some examples, the watermark encoder circuitry 408 may be instantiated by hardware logic circuitry, which may be implemented by an ASIC, XPU, or the FPGA circuitry 1200 of FIG. 12 structured to perform operations corresponding to the machine readable instructions. Additionally or alternatively, the watermark encoder circuitry 408 may be instantiated by any other combination of hardware, software, and/or firmware. For example, the watermark encoder circuitry 408 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the encoder manager 208 includes means for publishing a media asset. For example, the means for publishing may be implemented by the media asset publisher circuitry 410. In some examples, the media asset publisher circuitry 410 may be instantiated by processor circuitry such as the example processor circuitry 1012 of FIG. 10. For instance, the media asset publisher circuitry 410 may be instantiated by the example microprocessor 1100 of FIG. 11 executing machine executable instructions such as those implemented by at least block 812 of FIG. 8. In some examples, the media asset publisher circuitry 410 may be instantiated by hardware logic circuitry, which may be implemented by an ASIC, XPU, or the FPGA circuitry 1200 of FIG. 12 structured to perform operations corresponding to the machine readable instructions. Additionally or alternatively, the media asset publisher circuitry 410 may be instantiated by any other combination of hardware, software, and/or firmware. For example, the media asset publisher circuitry 410 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the encoder manager 208 includes means for interfacing with a network. For example, the means for interfacing with a network may be implemented by the network interface circuitry 412. In some examples, the network interface circuitry 412 may be instantiated by processor circuitry such as the example processor circuitry 1012 of FIG. 10. For instance, the network interface circuitry 412 may be instantiated by the example microprocessor 1100 of FIG. 11 executing machine executable instructions such as those implemented by at least block 802 of FIG. 7. In some examples, the network interface circuitry 412 may be instantiated by hardware logic circuitry, which may be implemented by an ASIC, XPU, or the FPGA circuitry 1200 of FIG. 12 structured to perform operations corresponding to the machine readable instructions. Additionally or alternatively, the network interface circuitry 412 may be instantiated by any other combination of hardware, software, and/or firmware. For example, the network interface circuitry 412 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the encoder manager 208 of FIG. 2 is illustrated in FIG. 3, one or more of the elements, processes, and/or devices illustrated in FIG. 3 may be combined, divided, re-arranged, omitted, eliminated, and/or implemented in any other way. Further, the example blockchain client interface circuitry 402, the media asset manager circuitry 404, the permission requestor circuitry 406, the watermark encoder circuitry 408, the media asset publisher circuitry 410, the network interface circuitry 412 and/or, more generally, the example encoder manager 208 of FIG. 3, may be implemented by hardware alone or by hardware in combination with software and/or firmware. Thus, for example, any of the example blockchain client interface circuitry 402, the media asset manager circuitry 404, the permission requestor circuitry 406, the watermark encoder circuitry 408, the media asset publisher circuitry 410, the network interface circuitry 412, and/or, more generally, the example encoder manager 208, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example encoder manager 208 of FIG. 2 may include one or more elements, processes, and/or devices in addition to, or instead of, those illustrated in FIG. 3, and/or may include more than one of any or all of the illustrated elements, processes and devices.

Figure 5:
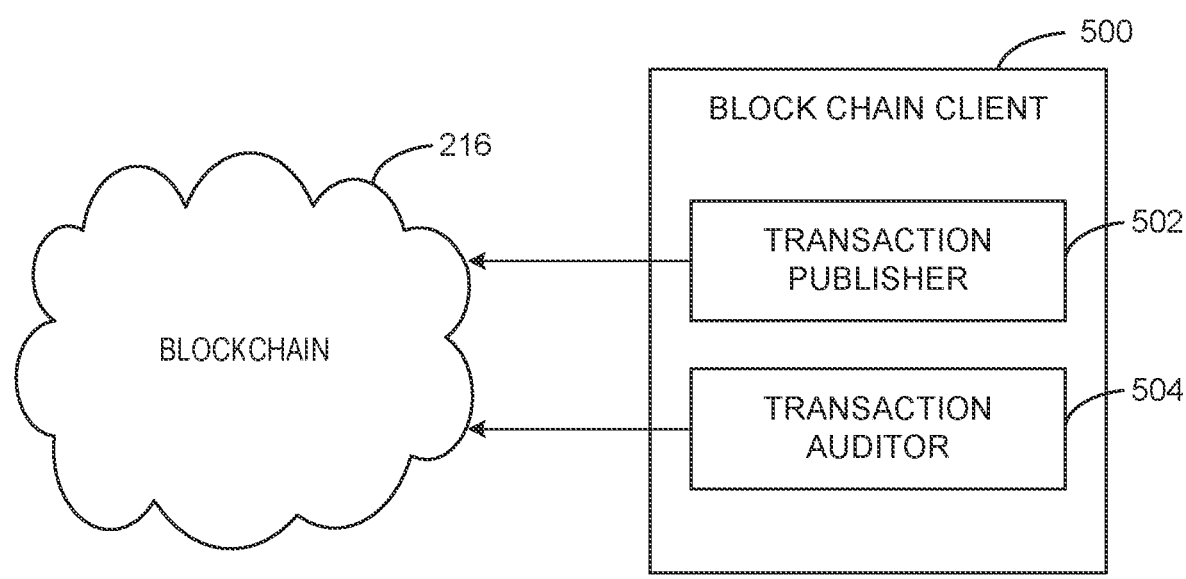
FIG. 5 is a block diagram of an example blockchain client included in the example system of FIG. 2.

FIG. 5 is a block diagram of a blockchain client 500 that can be used to implement the first blockchain client 210A of the central facility device 202 of FIG. 2 and/or the second blockchain client 210B of the media broadcaster device 201 of FIG. 2. The example blockchain client 500 of FIG. 5 includes an example transaction publisher 502 and an example transaction auditor 504. In the illustrated example of FIG. 5, the blockchain client 500 interfaces with an example blockchain 216.

The blockchain client 500 includes the transaction publisher 502 to publish records of data transactions to the blockchain 216. For example, to publish a record of a transaction, the transaction publisher 502 can transmit a request containing the record to one or more of the nodes associated with the blockchain 216 (e.g., the devices 201, 202, etc.). In response to the request, one or more of the nodes will include the record in a block of records and attempt to add the block to the blockchain in accordance with the blockchain technology described in conjunction with FIG. 2. In some examples, a given record to be published by the transaction publisher 502 includes a label (e.g., a hash, etc.) identifying the data (e.g., the associated media asset, the encoded TICs, etc.) that is associated with the transaction. In some examples, this information can be used by the media identification database 116 to the associated the media asset 112 with the associated TIC.

The blockchain client 500 includes the transaction auditor 504 to audit the records contained in the blockchain 216. Because the records contained in the blockchain include labels (e.g., hashes) identifying the data that is the subject of each record, the transaction auditor 504 can examine the blockchain 216 to identify records associated with specific data of interest. If a record associated with the specific data of interest is found, the transaction auditor 504 can further examine the contents of the record, such as the identifier of the publisher device included in the record, the encoded TICs, etc. to determine whether the data transaction associated with the record was proper or improper. If the data transaction was improper, the transaction auditor 504 can notify an appropriate device (e.g., one or more devices 201, 202, etc.) of the improper data transaction to enable an appropriate remedial action (e.g., such as presenting a message at the associated node, sending a message to a user of one or more of the devices 201, 202, etc.).

Figure 6:
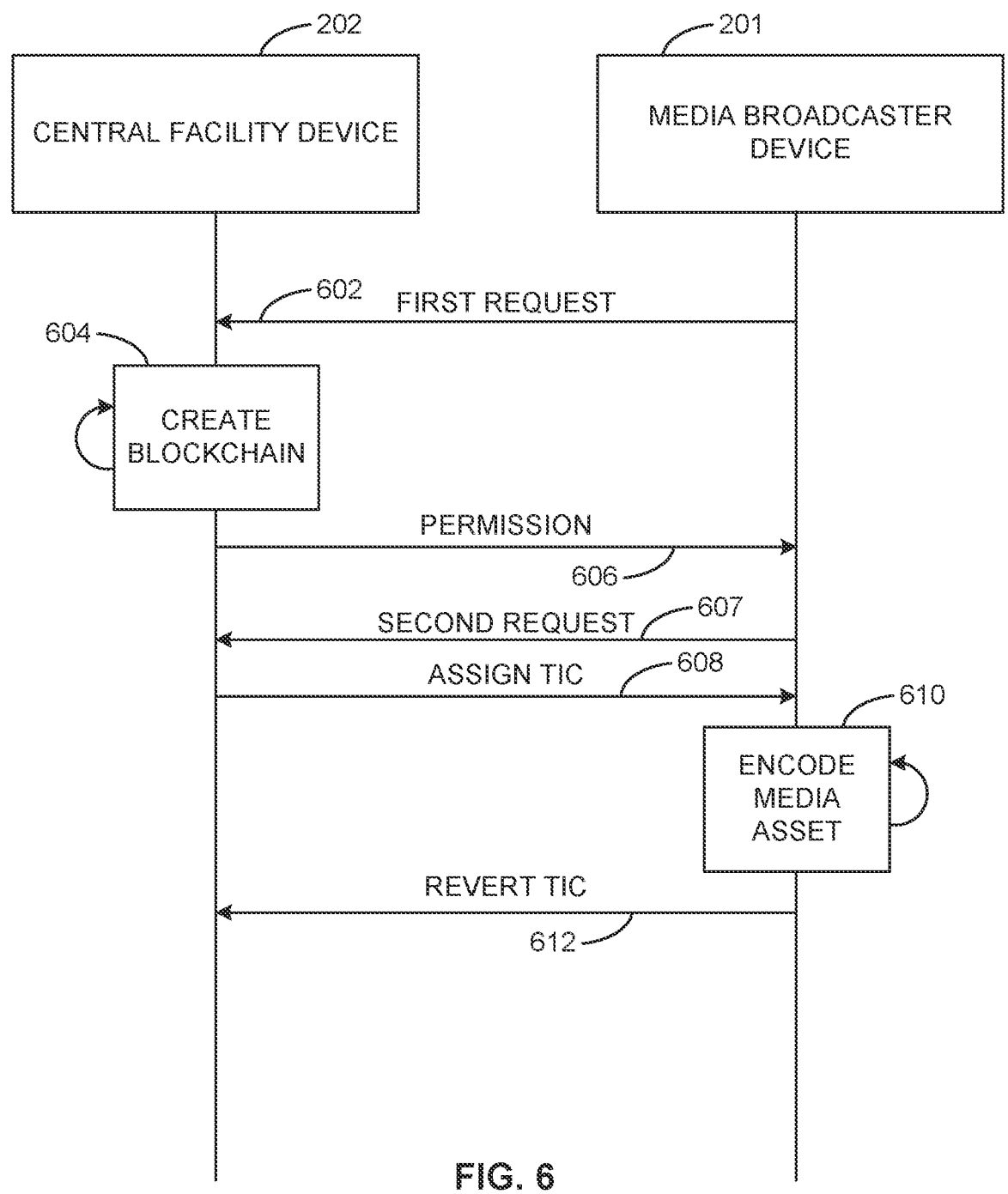
FIG. 6 is an example communication diagram for the example watermark encoding system of FIG. 2.

Referring now to FIG. 6, FIG. 6 is an example communication diagram illustrating an example transaction on a SID blockchain between the central facility device 202 and a media broadcaster device 201. In the illustrated example of FIG. 6, the media broadcaster device 201 begins by sending an example request 602 to the central facility device 202. The example request 602 for permission to begin encoding media assets. In response to receiving the request, the central facility device 202 generates an example blockchain 604. For example, the central facility device 202 can generate a SID to be associated with the media broadcaster device 201 and a corresponding blockchain. In such examples, the generation of the blockchain 604 associated with the SID involves the creation of TICs as the transaction medium of the blockchain and a ledger associated with TICs. In the illustrated example of FIG. 6, the blockchain 604 is generated with a finite number of TICs. After creating the blockchain for the media broadcaster device 201, the central facility device 202 grants an example permission 606 to the media broadcaster device 201 to conduct transactions on the blockchain 604 and view the ledger associated with the blockchain 604. In some examples, the permission 606 can include credentials and/or a token to enable the media broadcaster device 201 to conduct transactions on the blockchain 604. In some examples, the permission 606 can include information related to the blockchain 604 (e.g., a URL associated with the blockchain 604, one or more identifiers associated with the blockchain 604, etc.). In some examples, the permission 606 can include software that, when executed by the media broadcaster device 201, enables the media broadcaster device 201 to conduct transactions on the blockchain 604 (e.g., software that generates a token, etc.).

After receiving the permission 606, the media broadcaster device 201 can generate a second request 607. The example second request 607 is a request to encode a watermark into a media asset (e.g., the media asset 106, etc.). For example, the second request 607 can include an identification of the media asset (e.g., a name, etc.) and/or a duration associated with the media asset to be encoded. After receiving the second request 607, the media broadcaster device 201 can assign TICs via an example transaction 608 of the blockchain 604 to the media broadcaster device 201. After being assigned the TICs, the media broadcaster device 201 can perform an example action 610 to encode the media assets with the assigned TICs and the SID associated with the blockchain 604. In some examples, the action 610 can be recorded on the ledger of the blockchain 604. After conducting the action 610 to encode the media asset, the media broadcaster device 201 reverts the assigned TICs to the central facility device 202 via an example second transaction 612.

In the illustrated example of FIG. 6, the media broadcaster device 201 is not able to reuse the assigned TICs after the second transaction 612. Additionally, the process illustrated in FIG. 6 obviates the need for the generation of metadata (e.g., the metadata 114, etc.) as the information is stored in the ledger associated with the blockchain 604. That is, the media broadcaster device 201 can read the ledger of the blockchain 604 to identify the media asset associated with a specific TIC/SID combination.

A flowchart representative of example machine readable instructions, which may be executed to configure processor circuitry to implement the watermark distributor manager of FIGS. 2 and 3 is shown in FIG. 7. The machine readable instructions may be one or more executable programs or portion(s) of an executable program for execution by processor circuitry, such as the processor circuitry 912 shown in the example processor platform 900 discussed below in connection with FIG. 9 and/or the example processor circuitry discussed below in connection with FIGS. 11 and/or 12. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 7, many other methods of implementing the example watermark distributor manager 206 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

A flowchart representative of example machine readable instructions, which may be executed to configure processor circuitry to implement the encoder manager of FIG. 204 of FIGS. 2 and 4 is shown in FIG. 8. The machine readable instructions may be one or more executable programs or portion(s) of an executable program for execution by processor circuitry, such as the processor circuitry 1012 shown in the example processor platform 1000 discussed below in connection with FIG. 8 and/or the example processor circuitry discussed below in connection with FIGS. 11 and/or 12. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 8, many other methods of implementing the example encoder manager 208 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 7 and 8 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 7 is a flowchart representative of example machine readable instructions and/or example operations 700 that may be executed and/or instantiated by the watermark distributor manager 206 to allocate TICs to a media broadcaster via the blockchain 216 to encode a media asset. The machine readable instructions and/or the operations 700 of FIG. 7 begin at block 702, at which the blockchain client interface circuitry 302 detects a request to encode a media asset from a node on the blockchain 216 administered by the central facility device 202. For example, the blockchain client interface circuitry 302 can detect a request (e.g., the first request 602 of FIG. 6, etc.) to encode an asset on the blockchain 216 associated with the media broadcaster device 201 and/or with the central facility device 202. In other examples, the request can be received from any other suitable source and/or means.

At block 704, the permission manager circuitry 304 determines if permission to encode the media asset is to be granted. For example, the permission manager circuitry 304 can base the determination of whether the permission request is to be granted on an identity of the media broadcaster device 201 and/or the media asset 106. In some examples, the permission manager circuitry 304 can deny a permission request if an encoded media asset (e.g., the encoded media asset 112, etc.) has already been generated from the media asset 106. In some examples, the permission manager circuitry 304 can deny a request if the media broadcaster device 201 has exceeded a quota of allocated TICs over a given period (e.g., a TIC quota over a given month, etc.). If the permission manager circuitry 304 determines permission is to be granted to encode the media asset, the operations 700 advance to block 706. If the permission manager circuitry 304 determines permission is not to be granted to encode the media asset, the operations advance to block 714.

At block 706, the code manager circuitry 306 allocates TICs to the requesting node based on the duration of the media asset. For example, the code manager circuitry 306 can allocate TICs via the blockchain 216 to the node. In some examples, the code manager circuitry 306 determines the quantity of TICs allocated to the requesting node (e.g., the requesting media broadcaster, etc.) based on the duration of the media asset (e.g., an appropriate number of TICs to encode the media watermark, etc.) and the encoding rate of the watermark associated with the TICs and the SID. In some examples, the code manager circuitry 306 allocates the TICs by conducting a transaction on the blockchain 216. In other examples, the code manager circuitry 306 can allocate the TICs in any other suitable manner.

At block 708, the blockchain client interface circuitry 302 receives the reverted TICs after the node encodes the media asset. For example, after encoding the media asset, the blockchain client interface circuitry 302 can, via a transaction on the SID blockchain, receive allocated TICs sent back to the central facility device 202 by the node. In other examples, the blockchain client interface circuitry 302 can receive the reverted TICs by any other suitable means.

At block 710, the encoding verification circuitry 308 verifies the encoding via the transaction records of the blockchain. For example, the central facility device 202 can verify the media asset was properly encoded (e.g., with the SID associated with the blockchain 216 and allocated TICs, etc.) via the ledger of the blockchain 216. For example, the encoding verification circuitry 308 can, via the blockchain client interface circuitry 302, verify the media asset was encoded by checking to verify the encoding is marked on the ledger of the blockchain 216. In other examples, the encoding verification circuitry 308 can verify the media asset 106 was encoded by any other suitable means (e.g., querying the media broadcaster device 201 via the network 212, etc.).

At block 712, the code manager circuitry 306 marks the reverted TICs as encoded in the SID/TIC database 110. For example, the code manager circuitry 306 can indicate in the SID/TIC database 110 that the SID and TIC codes have been used. In some such examples, the code manager circuitry 306 prevents the SID/TIC combination from being encoded in other media assets, thereby making identification of the encoded media asset more efficient (e.g., reducing the likelihood signature-based identification will need to be employed, etc.)

At block 713, the media identification database interface circuitry 310 can associate the SID/TIC combination (e.g., the watermark portions, etc.) and the media asset 106 to ensure the media identification database 116 can be used to identify the media asset via the SID/TIC combination. In some examples, the media identification database interface circuitry 310 can edit the media identification database 116 in any other suitable manner.

At block 714, the network interface circuitry 412 informs the media broadcaster of the permission denial. For example, the network interface circuitry 412 can transmit the permission request over the network 212. In other examples, the network interface circuitry 412 can transmit a permission denial notification over the blockchain 216. In other examples, the network interface circuitry 412 can transmit the permission notification by any other suitable means. The operations 700 end.

FIG. 8 is a flowchart representative of example machine readable instructions and/or example operations 700 that may be executed and/or instantiated by processor circuitry to encode a media asset with watermark information received via a blockchain. The machine readable instructions and/or the operations 800 of FIG. 8 begin at block 801, at which the media asset manager circuitry 404 receives the media asset 106. For example, the media asset manager circuitry 404 can access the media asset 106 from a database associated with the media broadcaster device 201. In some examples, the media asset 106 can be extracted by the media asset manager circuitry 404 from a live media stream (e.g., a live media broadcast, etc.).

At block 802, at which the permission requestor circuitry 406, via the blockchain client interface circuitry 402 and/or the network interface circuitry 412, transmits a request to encode a media asset. For example, the permission requestor circuitry 406 can send a request (e.g., the second request 607 of FIG. 6, etc.) to an administrative node (e.g., the central facility device 202, etc.) prior to uploading a media asset to a multichannel on-demand service (e.g., MVPD 118, etc.). In some examples, the permission requestor circuitry 406 can send the request via the blockchain 216 associated with the permission requestor circuitry 406 the administrative node of the blockchain 216. In other examples, the permission requestor circuitry 406 can transmit the request in any other suitable manner.

At block 804, the permission requestor circuitry 406 determines if the requested TICS and/or permission TICs to encode the media asset have been received. For example, if the permission requestor circuitry 406 can, via the blockchain client interface circuitry 402, determine if a transaction has occurred transferring the requested TICs to the media broadcaster device 201. In other examples, the permission requestor circuitry 406 can determine if the permission has been received by any other suitable means. If the media broadcaster device 201 determines the TICs have been received, the operations 800 advances to block 806. If the media broadcaster device 201 determines the TICs have not been received, the operations return to block 802.

At block 806, the watermark encoder circuitry 408 encodes the media asset 106 with the SID associated with the blockchain 216 and the received TICs. For example, the watermark encoder circuitry 408 can encode the media asset 106 with the received TICs (e.g., first watermark portions, etc.) and the SID associated with the blockchain 216 (e.g., second watermark portions, etc.) using any appropriate watermarking techniques. In other examples, the watermark encoder circuitry 408 can encode the media asset 106 in any other suitable manner. In some examples, the encoding of the media asset 106 can be recorded on the ledger associated with the blockchain 216.

At block 808, the blockchain client interface circuitry 402 publishes the encoding of the media asset of the blockchain 216. For example, the blockchain client interface circuitry 402 can conduct a transaction on the blockchain 216 to indicate the media asset 106 has been encoded with the requested TICs. In other examples, the watermark encoder circuitry 408 can encode the media asset 106 via a transaction on the blockchain 216. In some examples, the execution of block 808 can be omitted.

At block 810, the blockchain client interface circuitry 402 reverts the encoding TICs to the administrative node. For example, the blockchain client interface circuitry 402 can conduct a transaction on the blockchain 216 to transmit the TICs back to the administrative node. In other examples, the blockchain client interface circuitry 402 and/or the network interface circuitry 412 can revert the encoding TICs back to the administrative node by any other suitable means.

At block 812, the media asset publisher circuitry 410 publishes the encoded media asset 112 to the MVPD 118. For example, the media asset publisher circuitry 410 can upload the encoded media asset to a server associated with the MVPD 118. In other examples, the media asset publisher circuitry 410 can publish the encoded media asset 112 by any other suitable means. The operations 800 end.

Figure 9:
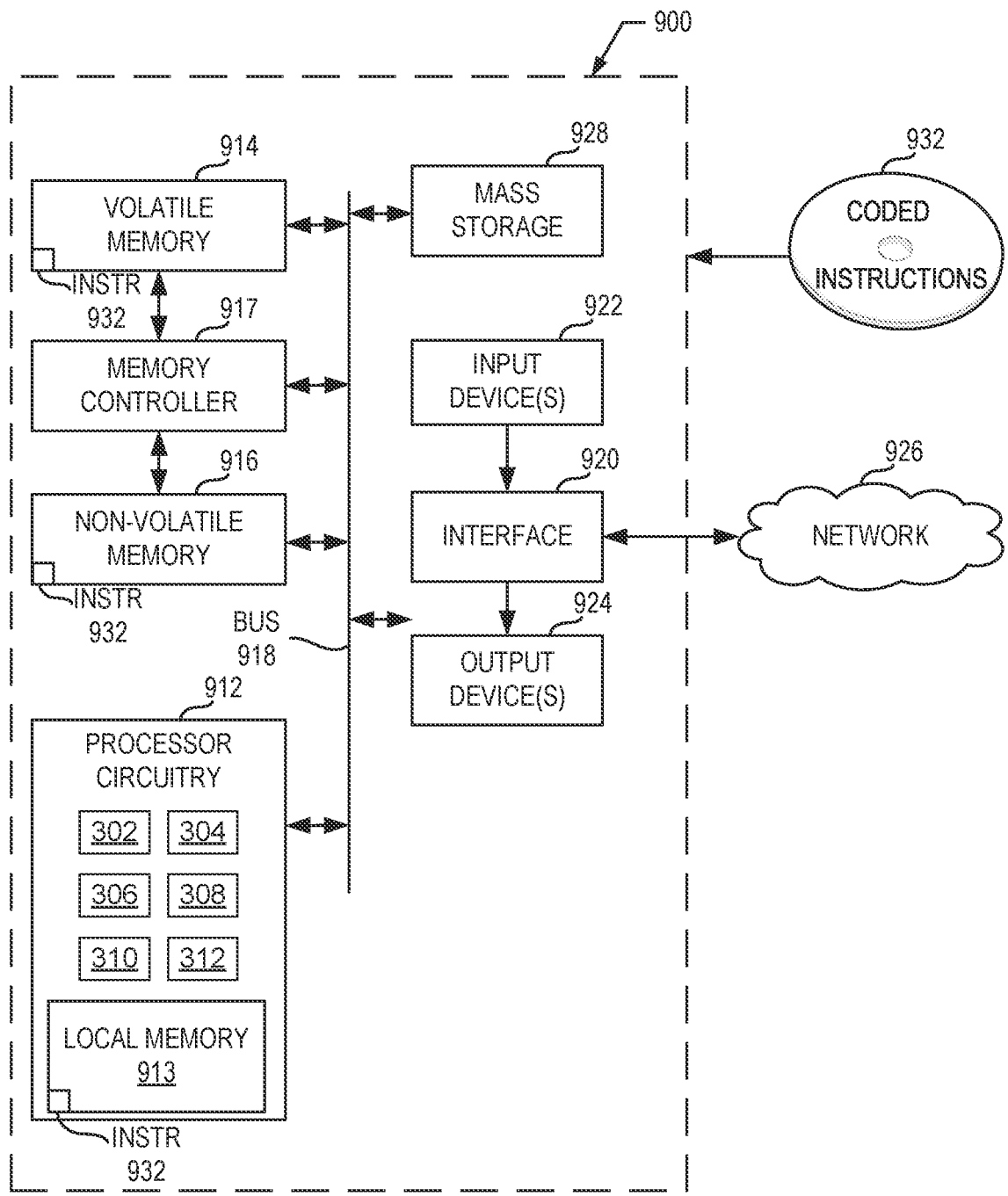
FIG. 9 is a block diagram of an example processing platform including processor circuitry structured to execute and/or instantiate the example machine readable instructions and/or the example operations of FIG. 7 to implement the watermark distributor manager of FIG. 3.

FIG. 9 is a block diagram of an example processor platform 900 structured to execute and/or instantiate the machine readable instructions and/or the operations of FIG. 7 to implement the watermark distributor manager 206 of FIGS. 2 and 3. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 900 of the illustrated example includes processor circuitry 912. The processor circuitry 912 of the illustrated example is hardware. For example, the processor circuitry 912 can be implemented by one or more integrated circuits, logic circuits, FPGAs, microprocessors, CPUs, GPUs, DSPs, and/or microcontrollers from any desired family or manufacturer. The processor circuitry 912 may be implemented by one or more semiconductor based (e.g., silicon based) devices. In this example, the processor circuitry 912 implements the blockchain client interface circuitry 302, the permission manager circuitry 304, the code manager circuitry 306, the encoding verification circuitry 308, the media identification database interface circuitry 310, and the network interface circuitry 312.

The processor circuitry 912 of the illustrated example includes a local memory 913 (e.g., a cache, registers, etc.). The processor circuitry 912 of the illustrated example is in communication with a main memory including a volatile memory 914 and a non-volatile memory 916 by a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 916 may be implemented by flash memory and/or any other desired type of memory device. Access to the main memory 914, 916 of the illustrated example is controlled by a memory controller 917.

The processor platform 900 of the illustrated example also includes interface circuitry 920. The interface circuitry 920 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 922 are connected to the interface circuitry 920. The input device(s) 922 permit(s) a user to enter data and/or commands into the processor circuitry 912. The input device(s) 922 can be implemented by, for example, an audio sensor, a microphone, a camera (still or video), a keyboard, a button, a mouse, a touchscreen, a track-pad, a trackball, an isopoint device, and/or a voice recognition system.

One or more output devices 924 are also connected to the interface circuitry 920 of the illustrated example. The output device(s) 924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 920 of the illustrated example, thus, typically includes a graphics driver card, a graphics driver chip, and/or graphics processor circuitry such as a GPU.

The interface circuitry 920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 926. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 900 of the illustrated example also includes one or more mass storage devices 928 to store software and/or data. Examples of such mass storage devices 928 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 932, which may be implemented by the machine readable instructions of FIG. 7, may be stored in the mass storage device 928, in the volatile memory 914, in the non-volatile memory 916, and/or on a removable non-transitory computer readable storage medium such as a CD or DVD.

Figure 10:
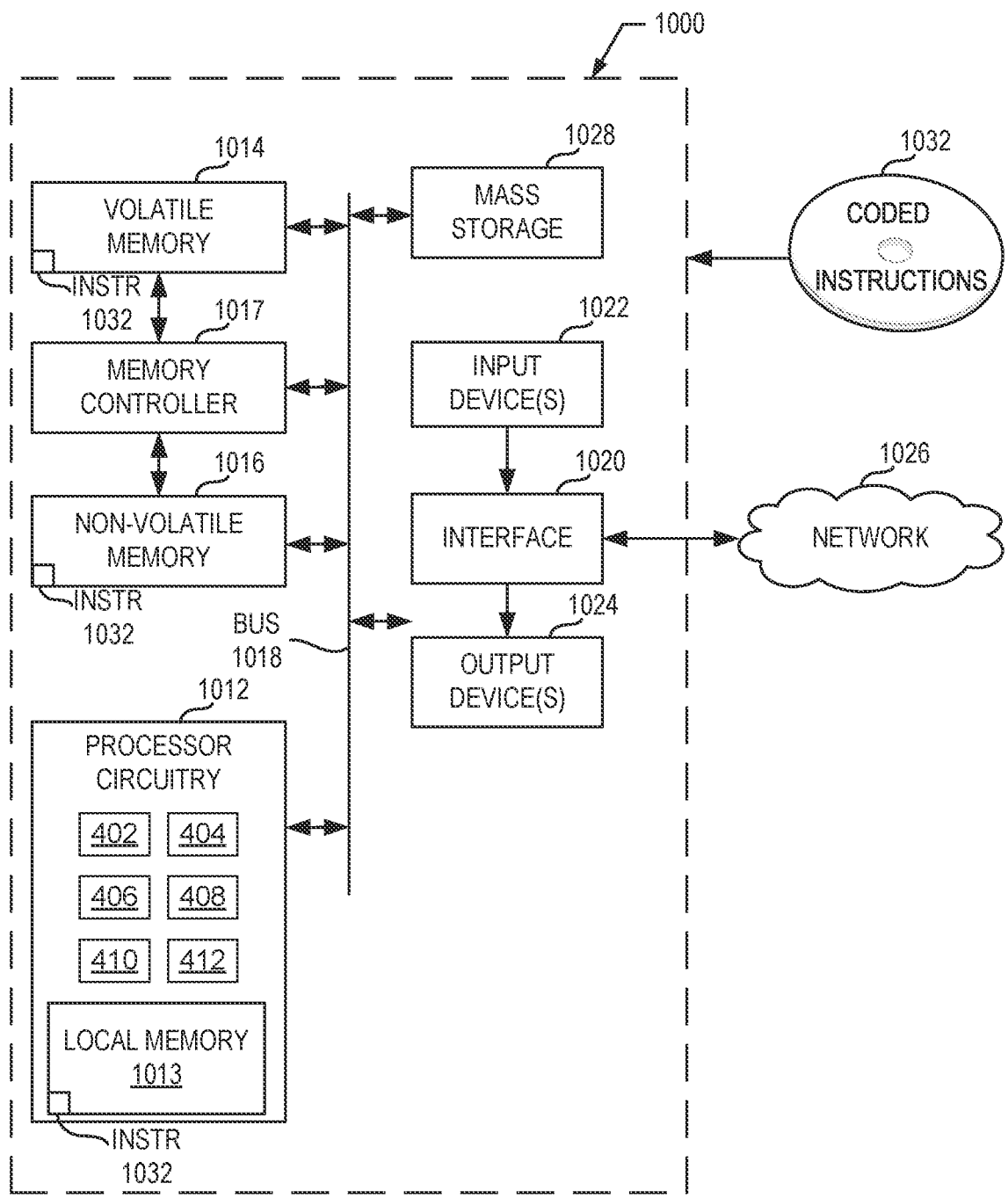
FIG. 10 is a block diagram of an example processing platform including processor circuitry structured to execute the example machine readable instructions and/or the example operations of FIG. 8 to implement the encoder manager of FIG. 4.

FIG. 10 is a block diagram of an example processor platform 1000 structured to execute and/or instantiate the machine readable instructions and/or the operations 800 of FIG. 8 to implement the encoder manager 208 of FIGS. 2 and 4. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1000 of the illustrated example includes processor circuitry 1012. The processor circuitry 1012 of the illustrated example is hardware. For example, the processor circuitry 1012 can be implemented by one or more integrated circuits, logic circuits, FPGAs, microprocessors, CPUs, GPUs, DSPs, and/or microcontrollers from any desired family or manufacturer. The processor circuitry 1012 may be implemented by one or more semiconductor based (e.g., silicon based) devices. In this example, the processor circuitry 912 implements the blockchain client interface circuitry 402, the media asset manager circuitry 404, the permission requestor circuitry 406, the watermark encoder circuitry 408, the media asset publisher circuitry 410, and the network interface circuitry 412.

The processor circuitry 1012 of the illustrated example includes a local memory 1013 (e.g., a cache, registers, etc.). The processor circuitry 1012 of the illustrated example is in communication with a main memory including a volatile memory 1014 and a non-volatile memory 1016 by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017.

The processor platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1022 are connected to the interface circuitry 1020. The input device(s) 1022 permit(s) a user to enter data and/or commands into the processor circuitry 1012. The input device(s) 1022 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1024 are also connected to the interface circuitry 1020 of the illustrated example. The output device(s) 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1000 of the illustrated example also includes one or more mass storage devices 1028 to store software and/or data. Examples of such mass storage devices 1028 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 1032, which may be implemented by the machine readable instructions of FIG. 8, may be stored in the mass storage device 1028, in the volatile memory 1014, in the non-volatile memory 1016, and/or on a removable non-transitory computer readable storage medium such as a CD or DVD.

Figure 11:
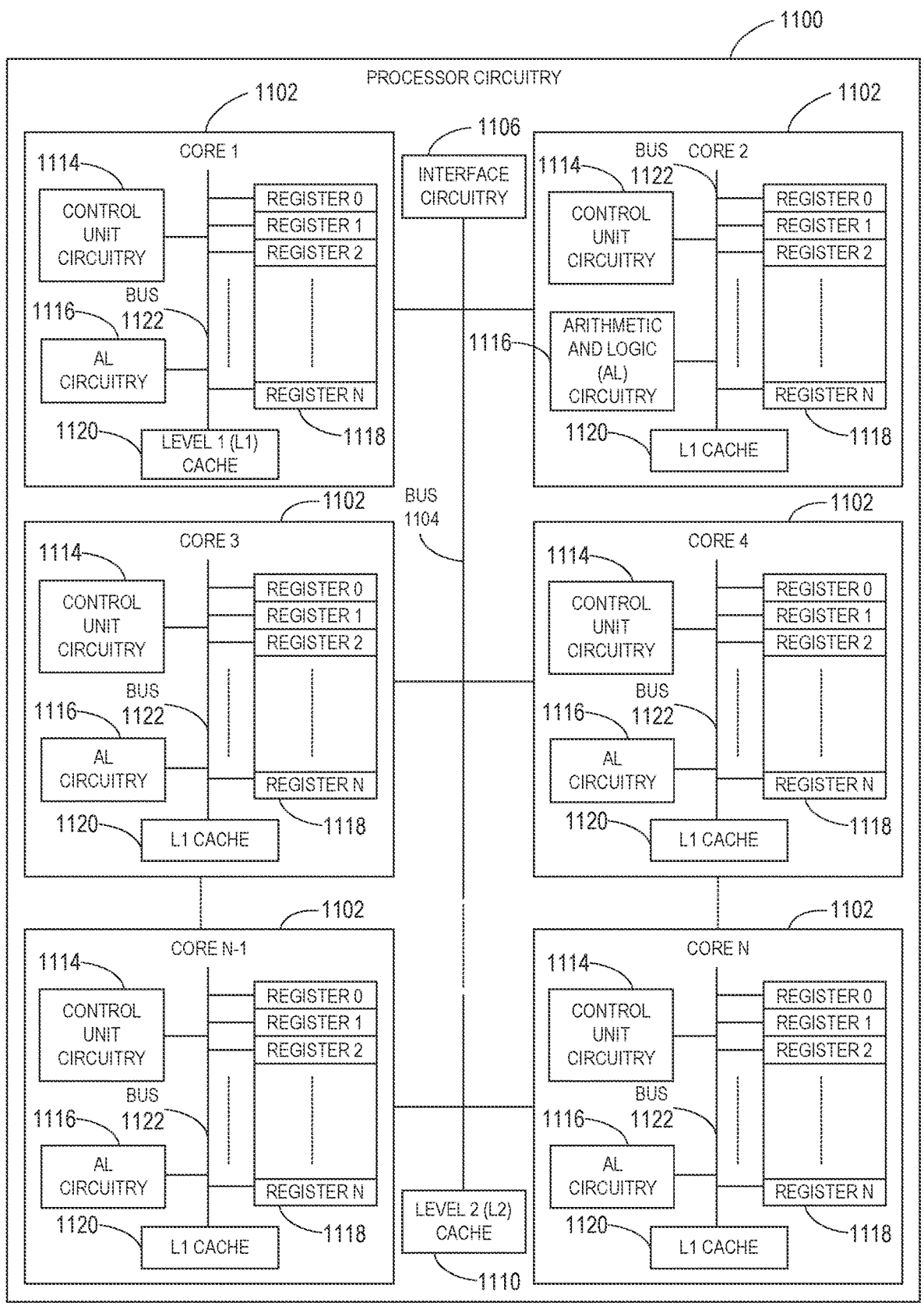
FIG. 11 is a block diagram of an example implementation of the processor circuitry of FIG. 9.

FIG. 11 is a block diagram of an example implementation of the processor circuitry 912 of FIG. 9 and/or the processor circuitry 1012 of FIG. 10. In this example the processor circuitry 912 of FIG. 9 and/or the processor circuitry 1012 of FIG. 10 is/are implemented by a general purpose microprocessor 1100. The general purpose microprocessor 1100 (e.g., microprocessor circuitry, etc.) executes some or all of the machine readable instructions of the flowcharts of FIGS. 7 and/or 8 to effectively instantiate the circuitry of FIGS. 3 and 4 as logic circuits to perform the operations corresponding to those machine readable instructions. In some such examples, the circuitry of FIGS. 3 and 4 is instantiated by the hardware circuits of the microprocessor 1100 in combination with the instructions. For example, the microprocessor 1100 may implement multi-core hardware circuitry such as a CPU, a DSP, a GPU, an XPU, etc. Although it may include any number of example cores 1102 (e.g., 1 core), the microprocessor 1100 of this example is a multi-core semiconductor device including N cores. The cores 1102 of the microprocessor 1100 may operate independently or may cooperate to execute machine readable instructions. For example, machine code corresponding to a firmware program, an embedded software program, or a software program may be executed by one of the cores 1102 or may be executed by multiple ones of the cores 1102 at the same or different times. In some examples, the machine code corresponding to the firmware program, the embedded software program, or the software program is split into threads and executed in parallel by two or more of the cores 1102. The software program may correspond to a portion or all of the machine readable instructions and/or operations represented by the flowcharts of FIGS. 7 and/or 8.

The cores 1102 may communicate by a first example bus 1104. In some examples, the first bus 1104 may implement a communication bus to effectuate communication associated with one(s) of the cores 1102. For example, the first bus 1104 may implement at least one of an Inter-Integrated Circuit (I2C) bus, a Serial Peripheral Interface (SPI) bus, a PCI bus, or a PCIe bus. Additionally or alternatively, the first bus 1104 may implement any other type of computing or electrical bus. The cores 1102 may obtain data, instructions, and/or signals from one or more external devices by example interface circuitry 1106. The cores 1102 may output data, instructions, and/or signals to the one or more external devices by the interface circuitry 1106. Although the cores 1102 of this example include example cache 1120 (e.g., Level 1 (L1) cache that may be split into an L1 data cache and an L1 instruction cache), the microprocessor 1100 also includes example shared memory 1110 that may be shared by the cores (e.g., Level 2 (L2_cache)) for high-speed access to data and/or instructions. Data and/or instructions may be transferred (e.g., shared) by writing to and/or reading from the shared memory 1110. The cache 1120 of each of the cores 1102 and the shared memory 1110 may be part of a hierarchy of storage devices including multiple levels of cache memory and the main memory (e.g., the main memory 914, 916 of FIG. 9, the main memory 1014, 1016 of FIG. 10, etc.). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1102 may be referred to as a CPU, DSP, GPU, etc., or any other type of hardware circuitry. Each core 1102 includes control unit circuitry 1114, arithmetic and logic (AL) circuitry 1116 (sometimes referred to as an ALU), a plurality of registers 1118, the L1 cache 1120, and a second example bus 1122. Other structures may be present. For example, each core 1102 may include vector unit circuitry, single instruction multiple data (SIMD) unit circuitry, load/store unit (LSU) circuitry, branch/jump unit circuitry, floating-point unit (FPU) circuitry, etc. The control unit circuitry 1114 includes semiconductor-based circuits structured to control (e.g., coordinate) data movement within the corresponding core 1102. The AL circuitry 1116 includes semiconductor-based circuits structured to perform one or more mathematic and/or logic operations on the data within the corresponding core 1102. The AL circuitry 1116 of some examples performs integer based operations. In other examples, the AL circuitry 1116 also performs floating point operations. In yet other examples, the AL circuitry 1116 may include first AL circuitry that performs integer based operations and second AL circuitry that performs floating point operations. In some examples, the AL circuitry 1116 may be referred to as an Arithmetic Logic Unit (ALU). The registers 1118 are semiconductor-based structures to store data and/or instructions such as results of one or more of the operations performed by the AL circuitry 1116 of the corresponding core 1102. For example, the registers 1118 may include vector register(s), SIMD register(s), general purpose register(s), flag register(s), segment register(s), machine specific register(s), instruction pointer register(s), control register(s), debug register(s), memory management register(s), machine check register(s), etc. The registers 1118 may be arranged in a bank as shown in FIG. 11. Alternatively, the registers 1118 may be organized in any other arrangement, format, or structure including distributed throughout the core 1102 to shorten access time. The second bus 1122 may implement at least one of an I2C bus, a SPI bus, a PCI bus, or a PCIe bus.

Each core 1102 and/or, more generally, the microprocessor 1100 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1100 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 12:
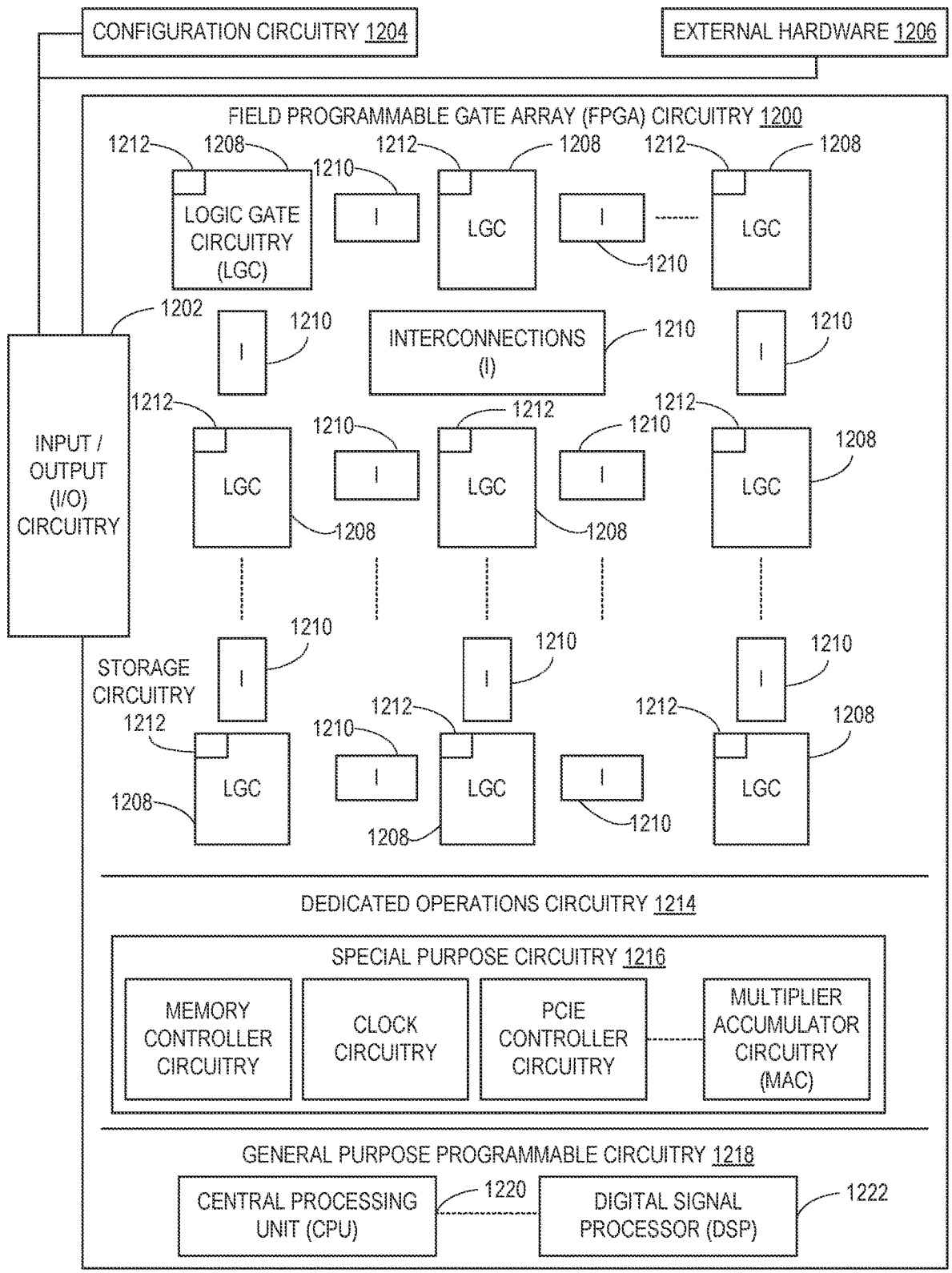
FIG. 12 is a block diagram of another example implementation of the processor circuitry of FIG. 9.

FIG. 12 is a block diagram of another example implementation of the processor circuitry 912 of FIG. 9 and/or the processor circuitry 1012 of FIG. 10. In this example the processor circuitry 912 of FIG. 9 and/or the processor circuitry 1012 of FIG. 10 is/are implemented by FPGA circuitry 1200. The FPGA circuitry 1200 can be used, for example, to perform operations that could otherwise be performed by the example microprocessor 1100 of FIG. 11 executing corresponding machine readable instructions. However, once configured, the FPGA circuitry 1200 instantiates the machine readable instructions in hardware and, thus, can often execute the operations faster than they could be performed by a general purpose microprocessor executing the corresponding software.

More specifically, in contrast to the microprocessor 1100 of FIG. 11 described above (which is a general purpose device that may be programmed to execute some or all of the machine readable instructions represented by the flowchart of FIGS. 7 and 8 but whose interconnections and logic circuitry are fixed once fabricated), the FPGA circuitry 1200 of the example of FIG. 12 includes interconnections and logic circuitry that may be configured and/or interconnected in different ways after fabrication to instantiate, for example, some or all of the machine readable instructions represented by the flowcharts of FIGS. 7 and 8. In particular, the FPGA circuitry 1200 may be thought of as an array of logic gates, interconnections, and switches. The switches can be programmed to change how the logic gates are interconnected by the interconnections, effectively forming one or more dedicated logic circuits (unless and until the FPGA circuitry 1200 is reprogrammed). The configured logic circuits enable the logic gates to cooperate in different ways to perform different operations on data received by input circuitry. Those operations may correspond to some or all of the software represented by the flowcharts of FIGS. 7 and 8. As such, the FPGA circuitry 1200 may be structured to effectively instantiate some or all of the machine readable instructions of the flowcharts of FIGS. 7 and 4 as dedicated logic circuits to perform the operations corresponding to those software instructions in a dedicated manner analogous to an ASIC. Therefore, the FPGA circuitry 1200 may perform the operations corresponding to the some or all of the machine readable instructions of FIGS. 7 and 8 faster than the general purpose microprocessor can execute the same.

In the example of FIG. 12, the FPGA circuitry 1200 is structured to be programmed (and/or reprogrammed one or more times) by an end user by a hardware description language (HDL) such as Verilog. The FPGA circuitry 1200 of FIG. 12, includes example input/output (I/O) circuitry 1202 to obtain and/or output data to/from example configuration circuitry 1204 and/or external hardware (e.g., external hardware circuitry) 1206. For example, the configuration circuitry 1204 may implement interface circuitry that may obtain machine readable instructions to configure the FPGA circuitry 1200, or portion(s) thereof. In some such examples, the configuration circuitry 1204 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1206 may implement the microprocessor 1100 of FIG. 11. The FPGA circuitry 1200 also includes an array of example logic gate circuitry 1208, a plurality of example configurable interconnections 1210, and example storage circuitry 1212. The logic gate circuitry 1208 and interconnections 1210 are configurable to instantiate one or more operations that may correspond to at least some of the machine readable instructions of FIGS. 3 and/or 4 and/or other desired operations. The logic gate circuitry 1208 shown in FIG. 12 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1208 to enable configuration of the electrical structures and/or the logic gates to form circuits to perform desired operations. The logic gate circuitry 1208 may include other electrical structures such as look-up tables (LUTs), registers (e.g., flip-flops or latches), multiplexers, etc.

The interconnections 1210 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1208 to program desired logic circuits.

The storage circuitry 1212 of the illustrated example is structured to store result(s) of the one or more of the operations performed by corresponding logic gates. The storage circuitry 1212 may be implemented by registers or the like. In the illustrated example, the storage circuitry 1212 is distributed amongst the logic gate circuitry 1208 to facilitate access and increase execution speed.

The example FPGA circuitry 1200 of FIG. 12 also includes example Dedicated Operations Circuitry 1214. In this example, the Dedicated Operations Circuitry 1214 includes special purpose circuitry 1216 that may be invoked to implement commonly used functions to avoid the need to program those functions in the field. Examples of such special purpose circuitry 1216 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1200 may also include example general purpose programmable circuitry 1218 such as an example CPU 1220 and/or an example DSP 1222. Other general purpose programmable circuitry 1218 may additionally or alternatively be present such as a GPU, an XPU, etc., that can be programmed to perform other operations.

Although FIGS. 11 and 12 illustrate two example implementations of the processor circuitry 912 of FIG. 9 and/or the processor circuitry 1012 of FIG. 10, many other approaches are contemplated. For example, as mentioned above, modern FPGA circuitry may include an on-board CPU, such as one or more of the example CPU 1220 of FIG. 12. Therefore, the processor circuitry 912 of FIG. 9 and/or the processor circuitry 1012 of FIG. 10 may additionally be implemented by combining the example microprocessor 1100 of FIG. 11 and the example FPGA circuitry 1200 of FIG. 12. In some such hybrid examples, a first portion of the machine readable instructions represented by the flowcharts of FIGS. 7 and 4 may be executed by one or more of the cores 1102 of FIG. 11, a second portion of the machine readable instructions represented by the flowcharts of FIGS. 7 and 8 may be executed by the FPGA circuitry 1200 of FIG. 12, and/or a third portion of the machine readable instructions represented by the flowcharts of FIGS. 7 and 8 may be executed by an ASIC. It should be understood that some or all of the circuitry of FIG. 1 may, thus, be instantiated at the same or different times. Some or all of the circuitry may be instantiated, for example, in one or more threads executing concurrently and/or in series. Moreover, in some examples, some or all of the circuitry of FIG. 6 may be implemented within one or more virtual machines and/or containers executing on the microprocessor.

In some examples, the processor circuitry 912 of FIG. 9 and/or the processor circuitry 1012 of FIG. 10 may be in one or more packages. For example, the microprocessor 1100 of FIG. 11 and/or the FPGA circuitry 1200 of FIG. 12 may be in one or more packages. In some examples, an XPU may be implemented by the processor circuitry 912 of FIG. 9 and/or the processor circuitry 1012 of FIG. 10, which may be in one or more packages. For example, the XPU may include a CPU in one package, a DSP in another package, a GPU in yet another package, and an FPGA in still yet another package.

Figure 13:
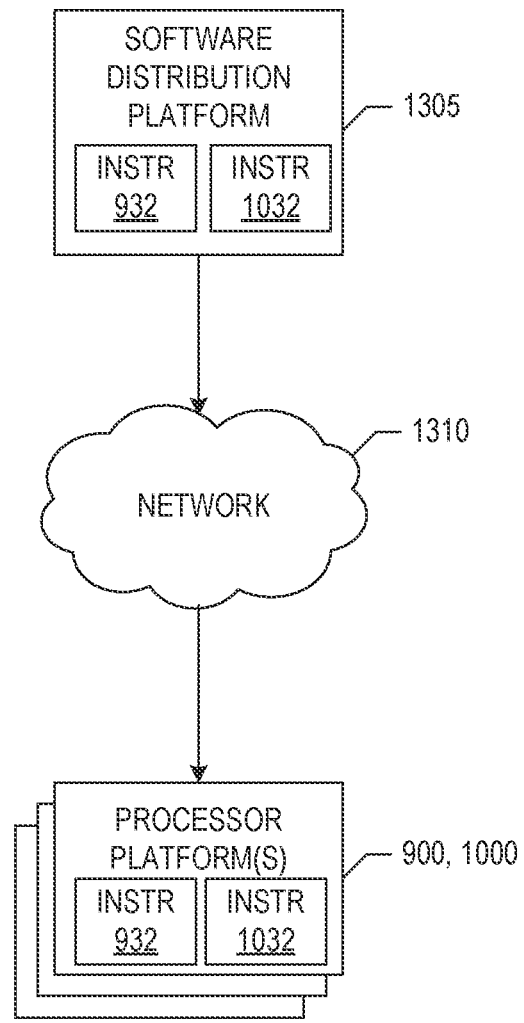
FIG. 13 is a block diagram of an example software distribution platform (e.g., one or more servers) to distribute software (e.g., software corresponding to the example machine readable instructions of FIGS. 7 and 8, etc.) to client devices associated with end users, media broadcasters, and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1305 to distribute software such as the example machine readable instructions 932 of FIG. 9 and/or the example machine readable instructions 1032 of FIG. 10 to hardware devices owned and/or operated by third parties is illustrated in FIG. 13. The example software distribution platform 1305 may be implemented by any computer server, data facility, cloud service, etc., capable of storing and transmitting software to other computing devices. The third parties may be customers of the entity owning and/or operating the software distribution platform 1305. For example, the entity that owns and/or operates the software distribution platform 1305 may be a developer, a seller, and/or a licensor of software such as the example machine readable instructions 932 of FIG. 9 and/or machine readable instructions 1032 of FIG. 10. The third parties may be consumers, users, retailers, OEMs, etc., who purchase and/or license the software for use and/or re-sale and/or sub-licensing. In the illustrated example, the software distribution platform 1305 includes one or more servers and one or more storage devices. The storage devices store the machine readable instructions 932, 1032 which may correspond to the example machine readable instructions of FIGS. 7 and 8, respectively, as described above. The one or more servers of the example software distribution platform 1305 are in communication with a network 1310, which may correspond to any one or more of the Internet and/or any out suitable network. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 932, 1032 from the software distribution platform 1305. For example, the software, which may correspond to the example machine readable instructions of FIGS. 7 and 8, may be downloaded to the example processor platforms 900, 1000, which is to execute the machine readable instructions 932, 1032, respectively to implement the watermark distributor manager 206 and/or the encoder manager 208. In some example, one or more servers of the software distribution platform 1305 periodically offer, transmit, and/or force updates to the software (e.g., the example machine readable instructions 932 of FIG. 9, the example machine readable instructions 1032 of FIG. 10, etc.) to ensure improvements, patches, updates, etc., are distributed and applied to the software at the end user devices.

Example methods, apparatus, systems, and articles of manufacture to methods and apparatus for decentralized content measurement are disclosed herein. Further examples and combinations thereof include the following:

Example 1 includes an apparatus comprising permission manager circuitry to detect a request from a requesting device, the request for watermark payload elements to encode in a media asset, and blockchain client interface circuitry to allocate, via a first transaction on a blockchain maintained by a blockchain network, the water payload elements.

Example 2 includes the apparatus of example 1, wherein the watermark payload elements are first watermark payload elements of watermarks to be embedded in the media asset, respective ones of the watermarks including corresponding ones of the first watermark payload elements and corresponding ones of second watermark payload elements.

Example 3 includes the apparatus of example 2, wherein the first watermark payload elements are time in content codes and the second watermark payload elements are source identification codes.

Example 4 includes the apparatus of example 2, wherein the first watermark payload elements are a transaction medium of the blockchain, the second watermark payload elements are based on an identity of the blockchain, and the blockchain client interface circuitry is to allocate the first watermark payload elements by transferring the first watermark payload elements to the requesting device via the blockchain.

Example 5 includes the apparatus of example 1, further including encoding verification circuitry to verify, via a ledger of the blockchain, the media asset has been encoded with the watermark payload elements.

Example 6 includes the apparatus of example 5, wherein the blockchain client interface circuitry is to obtain, via a second transaction on the blockchain, the watermark payload elements from the requesting device and store the watermark payload elements in a database, and further including media identification database interface circuitry to designate the watermark payload elements stored in the database as previously encoded.

Example 7 includes the apparatus of example 1, wherein the blockchain is private to a first node of the blockchain network associated with the requesting device and a second node of the blockchain network associated with the blockchain client interface circuitry.

Example 8 includes a method comprising detecting a request from a requesting device, the request for watermark payload elements to encode in a media asset, and allocating, via a first transaction on a blockchain maintained by a blockchain network, the water payload elements.

Example 9 includes the method of example 8, wherein the watermark payload elements are first watermark payload elements of watermarks to be embedded in the media asset, respective ones of the watermarks including corresponding ones of the first watermark payload elements and corresponding ones of second watermark payload elements.

Example 10 includes the method of example 9, wherein the first watermark payload elements are time in content codes and the second watermark payload elements are source identification codes.

Example 11 includes the method of example 9, wherein the first watermark payload elements are a transaction medium of the blockchain, the second watermark payload elements are based on an identity of the blockchain, and the allocating of the first watermark payload elements includes transferring the first watermark payload elements to the requesting device via the blockchain.

Example 12 includes the method of example 8, further including encoding verification circuitry to verify, via a ledger of the blockchain, the media asset has been encoded with the watermark payload elements.

Example 13 includes the method of example 12, further including obtaining, via a second transaction on the blockchain, the watermark payload elements from the requesting device and store the watermark payload elements in a database, and designating the watermark payload elements stored in the database as previously encoded.

Example 14 includes At least one non-transitory computer readable medium comprising computer readable instructions that, when executed, cause at least one processor to at least detect a request from a requesting device, the request for watermark payload elements to encode in a media asset, and allocate, via a first transaction on a blockchain maintained by a blockchain network, the water payload elements.

Example 15 includes the at least one non-transitory computer readable medium of example 14, wherein the watermark payload elements are first watermark payload elements of watermarks to be embedded in the media asset, respective ones of the watermarks including corresponding ones of the first watermark payload elements and corresponding ones of second watermark payload elements.

Example 16 includes the at least one non-transitory computer readable medium of example 15, wherein the first watermark payload elements are time in content codes and the second watermark payload elements are source identification codes.

Example 17 includes the at least one non-transitory computer readable medium of example 15, wherein the first watermark payload elements are a transaction medium of the blockchain, the second watermark payload elements are based on an identity of the blockchain, and the instructions cause the at least one processor to allocate of the first watermark payload elements includes by transferring the first watermark payload elements to the requesting device via the blockchain.

Example 18 includes the at least one non-transitory computer readable medium of example 14, wherein the instructions cause the at least one processor to verify, via a ledger of the blockchain, the media asset has been encoded with the watermark payload elements.

Example 19 includes the at least one non-transitory computer readable medium of example 18, wherein the instructions cause the at least one processor to obtain, via a second transaction on the blockchain, the watermark payload elements from the requesting device and store the watermark payload elements in a database, and designate the watermark payload elements stored in the database as previously encoded.

Example 20 includes the at least one non-transitory computer readable medium of example 14, wherein the blockchain is private to a first node of the blockchain network associated with the requesting device and a second node of the blockchain network.

Example 21 includes an apparatus comprising permission requestor circuitry to transmit a request, via a first transaction on a blockchain of a blockchain network, for watermark payload elements, watermark encoder circuitry to obtain the watermark payload elements via a second transaction on the blockchain and encode a media asset with the watermark payload elements, and blockchain client interface circuitry to return the watermark payload elements to a central facility device via a third transaction on the blockchain.

Example 22 includes the apparatus of example 21, wherein the watermark payload elements are first watermark payload elements of watermarks to be embedded in the media asset, respective ones of the watermarks including corresponding ones of the first watermark payload elements and corresponding ones of second watermark payload elements, the second watermark payload elements based on an identity of the blockchain.

Example 23 includes the apparatus of example 22, wherein the first watermark payload elements are time in content codes and the second watermark payload elements are source identification codes.

Example 24 includes the apparatus of example 21, wherein the watermark payload elements are a transaction medium of the blockchain.

Example 25 includes the apparatus of example 21, wherein the blockchain is private to a first node associated with the central facility device and a second node associated with the blockchain client interface circuitry.

Example 26 includes the apparatus of example 21, further including media asset publisher circuitry to publish the encoded media asset to a multichannel video programming distributor, the encoded media asset to be presented on-demand by the multichannel video programming distributor.

Example 27 includes the apparatus of example 21, wherein the request includes a length of the media asset, and a quantity of the watermark payload elements is based on the length.

Example 28 includes a method comprising transmitting a request, via a first transaction on a blockchain of a blockchain network, for watermark payload elements, obtaining the watermark payload elements via a second transaction on the blockchain and encode a media asset with the watermark payload elements, and returning the watermark payload elements to a central facility device via a third transaction on the blockchain.

Example 29 includes the method of example 28, wherein the watermark payload elements are first watermark payload elements of watermarks to be embedded in the media asset, respective ones of the watermarks including corresponding ones of the first watermark payload elements and corresponding ones of second watermark payload elements, the second watermark payload elements based on an identity of the blockchain.

Example 30 includes the method of example 29, wherein the first watermark payload elements are time in content codes and the second watermark payload elements are source identification codes.

Example 31 includes the method of example 28, wherein the watermark payload elements are a transaction medium of the blockchain.

Example 32 includes the method of example 28, wherein the blockchain is private to a first node associated with the central facility device and a second node.

Example 33 includes the method of example 28, further including publishing the encoded media asset to a multichannel video programming distributor, the encoded media asset to be presented on-demand by the multichannel video programming distributor.

Example 34 includes At least one non-transitory computer readable medium comprising computer readable instructions that, when executed, cause at least one processor to at least transmit a request, via a first transaction on a blockchain of a blockchain network, for watermark payload elements, obtain the watermark payload elements via a second transaction on the blockchain and encode a media asset with the watermark payload elements, and return the watermark payload elements to a central facility device via a third transaction on the blockchain.

Example 35 includes the at least one non-transitory computer readable medium of example 34, wherein the watermark payload elements are first watermark payload elements of watermarks to be embedded in the media asset, respective ones of the watermarks including corresponding ones of the first watermark payload elements and corresponding ones of second watermark payload elements, the second watermark payload elements based on an identity of the blockchain.

Example 36 includes the at least one non-transitory computer readable medium of example 35, wherein the first watermark payload elements are time in content codes and the second watermark payload elements are source identification codes.

Example 37 includes the at least one non-transitory computer readable medium of example 34, wherein the watermark payload elements are a transaction medium of the blockchain.

Example 38 includes the at least one non-transitory computer readable medium of example 37, wherein the blockchain is private to a first node associated with the central facility device and a second node.

Example 39 includes the at least one non-transitory computer readable medium of example 18, wherein the instructions cause the at least one processor to publish the encoded media asset to a multichannel video programming distributor, the encoded media asset to be presented on-demand by the multichannel video programming distributor.

Example 40 includes the at least one non-transitory computer readable medium of example 34, wherein the request includes a length of the media asset, and a quantity of the watermark payload elements is based on the length.

From the foregoing, it will be appreciated that example systems, methods, apparatus, and articles of manufacture have been disclosed that use decentralized content measurement using blockchain technology. Disclosed systems, methods, apparatus, and articles of manufacture improve the efficiency of using a computing device by enabling clients to negotiate for tag metadata in a secure environment isolated from other users. Unlike prior systems, the present system does not necessarily require files to transfer and creates an immutable record that prevents duplication of watermarks. Disclosed systems, methods, apparatus, and articles of manufacture are accordingly directed to one or more improvement(s) in the operation of a machine such as a computer or other electronic and/or mechanical device.

The following claims are hereby incorporated into this Detailed Description by this reference, with each claim standing on its own as a separate embodiment of the present disclosure.

What is claimed is:

1. A computing system comprising a processor and a memory, the computing system configured to perform a set of acts comprising:
   receiving, from a blockchain client of media broadcaster device, a request for permission to begin encoding media assets;
   based on the request for permission, generating, by a blockchain client of the computing system, a blockchain of a multichain system for a respective source identifier associated with the media broadcaster device;
   granting a permission to the blockchain client of the media broadcaster device to conduct transactions on the blockchain for the respective source identifier, wherein the permission identifies the blockchain for the respective source identifier;
   detecting a watermark payload request from the blockchain client of the media broadcaster device, the watermark payload request seeking time in content codes to encode in a media asset; and
   based on detecting the watermark payload request from the blockchain client of the media broadcaster device, allocating, by the blockchain client of the computing system via a first transaction on the blockchain for the respective source identifier, a set of time in content codes,
   wherein the set of time in content codes is based on data in a database that indicates previously allocated time in content codes for the respective source identifier, and
   wherein the media broadcaster device uses the respective source identifier and the set of time in content codes to encode watermarks in the media asset.

2. The computing system of claim 1, wherein the set of acts further comprises verifying, via a ledger of the blockchain for the respective source identifier, the media asset has been encoded with the respective source identifier and a time in content code of the set of time in content codes.

3. The computing system of claim 1, wherein the blockchain for the respective source identifier is private to the blockchain client of the media broadcaster device and the blockchain client of the computing system.

4. The computing system of claim 1, wherein the set of time in content codes comprises a start time in content code and an end time in content code.

5. The computing system of claim 1, wherein generating the blockchain for the respective source identifier comprises creating time in content codes as a transaction medium of the blockchain for the respective source identifier and creating a ledger associated with the time in content codes.

6. The computing system of claim 1, wherein granting permission includes providing credentials to enable the blockchain client of the media broadcaster device to conduct the transactions on the blockchain for the respective source identifier.

7. The computing system of claim 1, wherein:
each blockchain of the multichain system is associated with a corresponding source identifier, and
the medium of transactions on each blockchain of the multichain system is time in content codes to be combined with the corresponding source identifier.

8. A method comprising:
receiving, from a blockchain client of media broadcaster device, a request for permission to begin encoding media assets;
based on the request for permission, generating, by a blockchain client of a computing system, a blockchain of a multichain system for a respective source identifier associated with the media broadcaster device;
granting a permission to the blockchain client of the media broadcaster device to conduct transactions on the blockchain for the respective source identifier, wherein the permission identifies the blockchain for the respective source identifier;
detecting a watermark payload request from the blockchain client of the media broadcaster device, the request seeking time in content codes to encode in a media asset; and
based on detecting the watermark payload request from the blockchain client of the media broadcaster device, allocating, by the blockchain client of the computing system via a first transaction on the blockchain for the respective source identifier, a set of time in content codes,
wherein the set of time in content codes is based on data in a database that indicates previously allocated time in content codes for the respective source identifier, and
wherein the media broadcaster device uses the respective source identifier and the set of time in content codes to encode watermarks in the media asset.

9. The method of claim 8, further including verifying, via a ledger of the blockchain for the respective source identifier, that the media asset has been encoded with the respective source identifier and a time in content code of the set of time in content codes.

10. The method of claim 8, wherein the set of time in content codes comprises a start time in content code and an end time in content code.

11. The method of claim 8, wherein generating the blockchain for the respective source identifier comprises creating time in content codes as a transaction medium of the blockchain for the respective source identifier and creating a ledger associated with the time in content codes.

12. The method of claim 8, wherein grating the permission includes providing credentials to enable the blockchain client of the media broadcaster device to conduct the transactions on the blockchain for the respective source identifier.

13. The method of claim 8, wherein:
each blockchain of the multichain system is associated with a corresponding source identifier, and
the medium of transactions on each blockchain of the multichain system is time in content codes to be combined with the corresponding source identifier.

14. At least one non-transitory computer readable medium comprising computer readable instructions that, when executed, cause at least one processor of a computing system to at least:
receive, from a blockchain client of media broadcaster device, a request for permission to begin encoding media assets;
based on the request for permission, generate, by a blockchain client of the computing system, a blockchain of a multichain system for a respective source identifier associated with the media broadcaster device;
grant a permission to the blockchain client of the media broadcaster device to conduct transactions on the blockchain for the respective source identifier, wherein the permission identifies the blockchain for the respective source identifier;
detect a watermark payload request from the blockchain client of the media broadcaster device, the request seeking time in content codes to encode in a media asset; and
based on detecting the watermark payload request from the blockchain client of the media broadcaster device, allocate, by the blockchain client of the computing system via a first transaction on the blockchain for the respective source identifier, a set of time in content codes,
wherein the set of time in content codes is based on data in a database that indicates previously allocated time in content codes for the respective source identifier, and
wherein the media broadcaster device uses the respective source identifier and the set of time in content codes to encode watermarks in the media asset.

15. The at least one non-transitory computer readable medium of claim 14, wherein the instructions cause the at least one processor to verify, via a ledger of the blockchain for the respective source identifier, that the media asset has been encoded with the respective source identifier and a time in content code of the set of time in content codes.

16. The at least one non-transitory computer readable medium of claim 14, wherein the blockchain for the respective source identifier is private to the blockchain client of the media broadcaster device and the blockchain client of the computing system.

17. The at least one non-transitory computer readable medium of claim 14, wherein the set of time in content codes comprises a start time in content code and an end time in content code.

18. The at least one non-transitory computer readable medium of claim 14, wherein generating the blockchain for the respective source identifier comprises creating time in content codes as a transaction medium of the blockchain for the respective source identifier and creating a ledger associated with the time in content codes.

19. The at least one non-transitory computer readable medium of claim 14, wherein granting the permission includes providing credentials to enable the blockchain client of the media broadcaster device to conduct the transactions on the blockchain for the respective source identifier.

20. The at least one non-transitory computer readable medium of claim 14, wherein:
each blockchain of the multichain system is associated with a corresponding source identifier, and
the medium of transactions on each blockchain of the multichain system is time in content codes to be combined with the corresponding source identifier.

* * * * *